United States Patent
Jang

(10) Patent No.: US 11,627,310 B2
(45) Date of Patent: Apr. 11, 2023

(54) AFFINE MOTION PREDICTION-BASED VIDEO DECODING METHOD AND DEVICE USING SUBBLOCK-BASED TEMPORAL MERGE CANDIDATE IN VIDEO CODING SYSTEM

(71) Applicant: LG Electronics Inc., Seoul (KR)

(72) Inventor: Hyeongmoon Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/420,241

(22) PCT Filed: Jan. 2, 2020

(86) PCT No.: PCT/KR2020/000016
§ 371 (c)(1),
(2) Date: Jul. 1, 2021

(87) PCT Pub. No.: WO2020/141879
PCT Pub. Date: Jul. 9, 2020

(65) Prior Publication Data
US 2022/0070442 A1     Mar. 3, 2022

Related U.S. Application Data

(60) Provisional application No. 62/787,741, filed on Jan. 2, 2019.

(51) Int. Cl.
*H04N 19/105*     (2014.01)
*H04N 19/132*     (2014.01)
(Continued)

(52) U.S. Cl.
CPC ......... *H04N 19/105* (2014.11); *H04N 19/132* (2014.11); *H04N 19/137* (2014.11); *H04N 19/176* (2014.11)

(58) Field of Classification Search
CPC .. H04N 19/105; H04N 19/132; H04N 19/137; H04N 19/176; H04N 19/513; H04N 19/52; H04N 19/593
See application file for complete search history.

(56) References Cited

U.S. PATENT DOCUMENTS

2019/0246103 A1\*  8/2019  Jun .................. H04N 19/91
2021/0289209 A1\*  9/2021  Lee ................. H04N 19/159

FOREIGN PATENT DOCUMENTS

| KR | 20180018388 | 2/2018 |
| KR | 20180037583 | 4/2018 |

(Continued)

*Primary Examiner* — Hesham K Abouzahra
(74) *Attorney, Agent, or Firm* — Fish & Richardson P.C.

(57) ABSTRACT

A video decoding method performed by a decoding device according to the present document is characterized by including: a step for deriving reference subblocks in a reference picture on the basis of the motion vector of an adjacent block on the left side of the current block; a step for deriving a subblock-based temporal merge candidate for the current block on the basis of motion information about the reference subblocks; a step for forming an affine merge candidate list for the current block, the affine merge candidate list including the subblock-based temporal merge candidate; a step for deriving motion information about subblocks of the current block on the basis of the affine merge candidate list; a step for deriving prediction samples for the current block on the basis of the motion information about the subblocks; and a step for generating a reconstructed picture on the basis of the prediction samples.

11 Claims, 19 Drawing Sheets

(51) Int. Cl.
*H04N 19/137* (2014.01)
*H04N 19/176* (2014.01)

(56) References Cited

FOREIGN PATENT DOCUMENTS

| | | |
|---|---|---|
| WO | WO 2017118409 | 7/2017 |
| WO | WO 2017156705 | 9/2017 |
| WO | WO 2018226066 | 12/2018 |

* cited by examiner

Translate

Scale

Rotate

Shear

Availability check order: A1→B1→B0→A0 fixed spatial position check: A1

AFFINE MOTION PREDICTION-BASED VIDEO DECODING METHOD AND DEVICE USING SUBBLOCK-BASED TEMPORAL MERGE CANDIDATE IN VIDEO CODING SYSTEM

CROSS-REFERENCE TO RELATED APPLICATIONS

This application is a National Stage application under 35 U.S.C. § 371 of International Application No. PCT/KR2020/000016, filed on Jan. 2, 2020, which claims the benefit of U.S. Provisional Application No. 62/787,741, filed on Jan. 2, 2019. The disclosures of the prior applications are incorporated by reference in their entirety.

BACKGROUND OF DISCLOSURE

Field of the Disclosure

This document relates to an image coding technology, and more particularly, to an affine motion prediction-based image decoding method and apparatus using an affine merge candidate list including a subblock-based temporal merging candidate in an image coding system.

Related Art

Recently, demand for high-resolution, high-quality images, such as High Definition (HD) images and Ultra High Definition (UHD) images, has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high-resolution and high-quality images.

SUMMARY

The purpose of this document is to provide a method and apparatus for improving image coding efficiency.

Another purpose of this document is to provide an image decoding method and apparatus which construct an affine merge candidate list of the current block including a sub-block-based temporal merging candidate derived based on a left neighboring block, and which perform prediction for the current block based on the constructed affine merge candidate list.

According to an embodiment of this document, an image decoding method performed by a decoding apparatus is provided. The method includes deriving reference sub-blocks in a reference picture based on a motion vector of a left neighboring block of a current block, deriving a sub-block-based temporal merging candidate for the current block based on motion information of the reference sub-blocks, constructing an affine merge candidate list for the current block including the subblock-based temporal merging candidate, deriving motion information of sub-blocks of the current block based on the affine merge candidate list, deriving prediction samples for the current block based on motion information of the sub-blocks, and generating a reconstructed picture based on the prediction samples.

According to another embodiment of this document, a decoding apparatus for performing image decoding is provided. The decoding apparatus includes a predictor deriving reference sub-blocks in a reference picture based on a motion vector of a left neighboring block of a current block, deriving a subblock-based temporal merging candidate for the current block based on motion information of the reference sub-blocks, constructing an affine merge candidate list for the current block including the subblock-based temporal merging candidate, deriving motion information of sub-blocks of the current block based on the affine merge candidate list, deriving prediction samples for the current block based on motion information of the sub-blocks, and an adder generating a reconstructed picture based on the prediction samples.

According to still another embodiment of this document, a video encoding method which is performed by an encoding apparatus is provided. The method includes deriving reference sub-blocks in a reference picture based on a motion vector of a left neighboring block of a current block, deriving a subblock-based temporal merging candidate for the current block based on motion information of the reference sub-blocks, constructing an affine merge candidate list for the current block including the subblock-based temporal merging candidate, deriving motion information of sub-blocks of the current block based on the affine merge candidate list, deriving prediction samples for the current block based on motion information of the sub-blocks, and encoding image information including prediction information for the current block.

According to still another embodiment of this document, a video encoding apparatus is provided. The encoding apparatus includes a predictor deriving reference sub-blocks in a reference picture based on a motion vector of a left neighboring block of a current block, deriving a subblock-based temporal merging candidate for the current block based on motion information of the reference sub-blocks, constructing an affine merge candidate list for the current block including the subblock-based temporal merging candidate, deriving motion information of sub-blocks of the current block based on the affine merge candidate list, and deriving prediction samples for the current block based on motion information of the sub-blocks, and an entropy encoder encoding image information including prediction information for the current block.

According to this document, it is possible to improve overall image/video compression efficiency.

According to this document, it is possible to reduce operational complexity of the affine merge mode, which can lead to generally improved efficiency of image coding.

According to this document, a subblock-based temporal merging candidate can be derived by referring only to a motion vector of a left neighboring block among neighboring blocks of the current block, and through this, it is possible to reduce the operational complexity of a process of deriving a subblock-based temporal merging candidate and the process of constructing the merge candidate list, and improve the coding efficiency.

DESCRIPTION OF EMBODIMENTS

Figure 1:
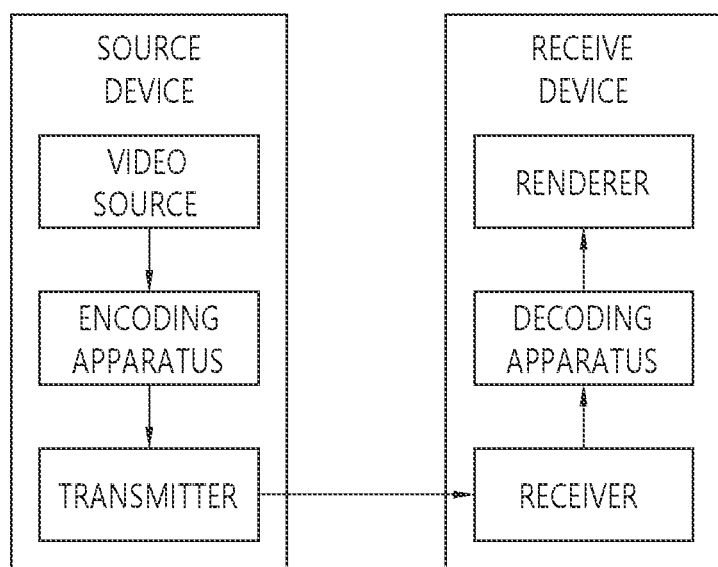
FIG. 1 briefly illustrates an example of a video/image coding device to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Present disclosure relates to video/image coding. For example, the methods/embodiments disclosed in the present disclosure may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present disclosure, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in the present disclosure should be interpreted to indicate "additionally or alternatively."

Figure 2:
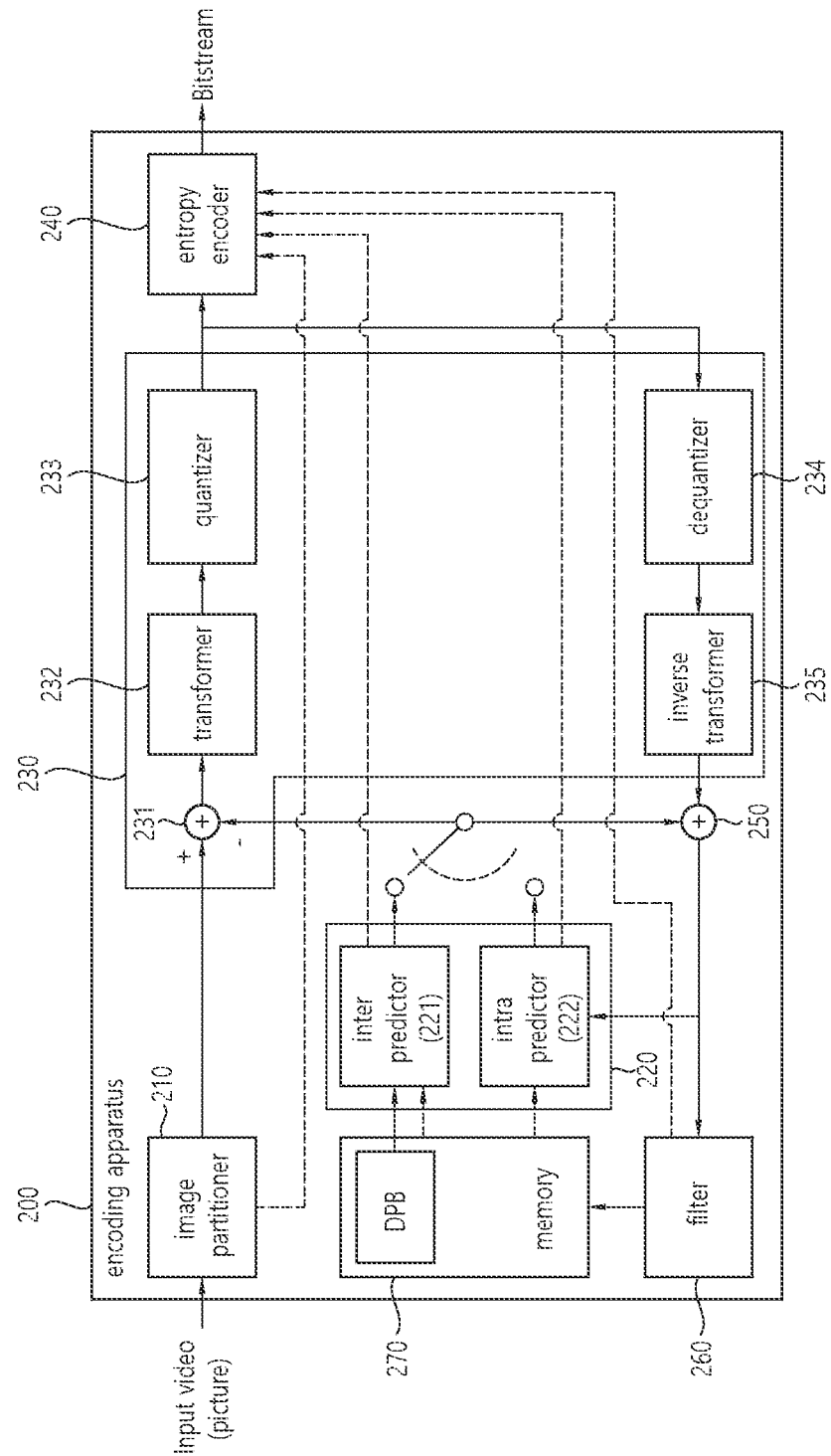
FIG. 2 is a schematic diagram illustrating a configuration of a video/image encoding apparatus to which the embodiment(s) of the present disclosure may be applied.

FIG. 2 is a schematic diagram illustrating a configuration of a video/image encoding apparatus to which the embodiment(s) of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loéve transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
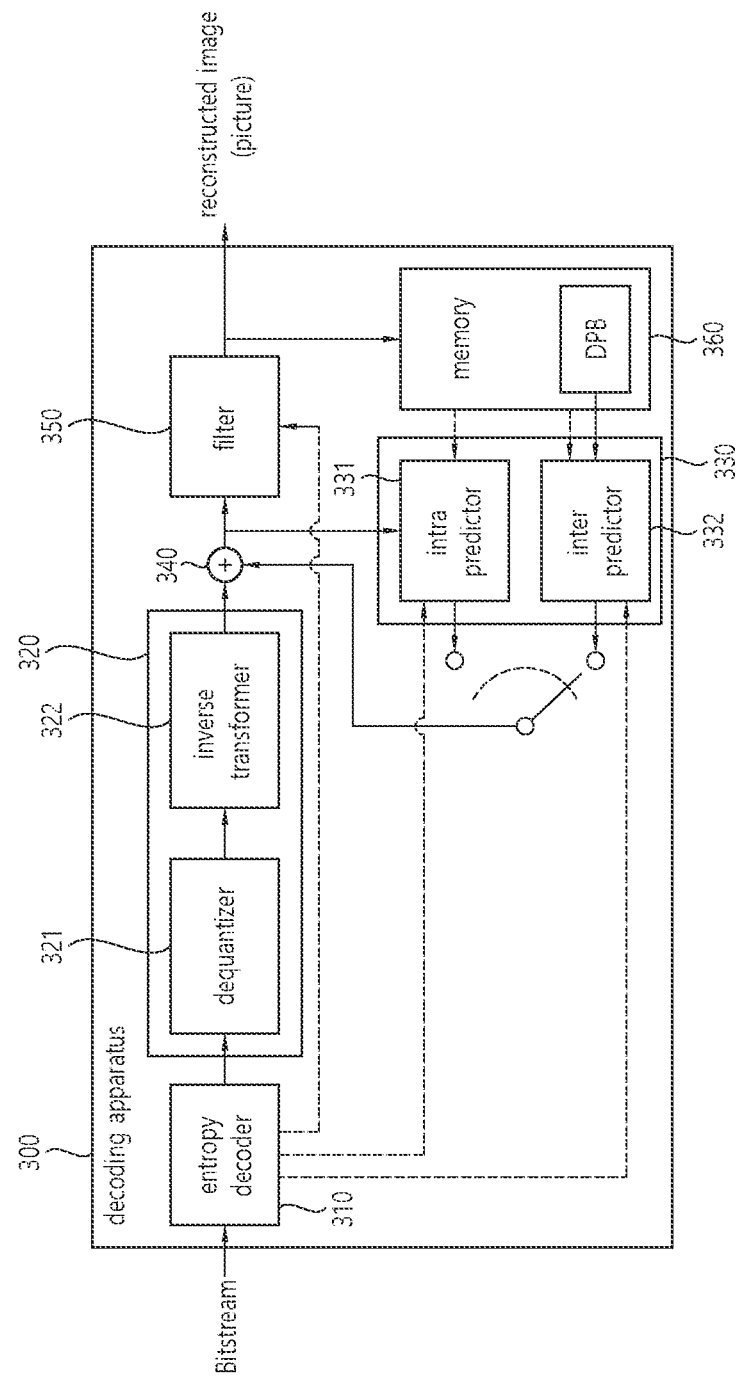
FIG. 3 is a schematic diagram illustrating a configuration of a video/image decoding apparatus to which the embodiment(s) of the present disclosure may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

Meanwhile, in the case of inter prediction, inter prediction method in which the distortion of image is considered is being proposed. Specifically, there is proposed an affine motion model which efficiently derives a motion vector for sample points or sub-blocks of the current block, and which increases the accuracy of inter prediction despite deformation such as rotation, zoom-in, or zoom-out of an image. That is, an affine motion model for deriving the motion vector for sub-blocks or sample points of the current block has been proposed. Prediction using the affine motion model may be referred to as affine inter prediction or affine motion prediction.

For example, the affine inter prediction using the affine motion model may efficiently express such four motions as described later, that is, such four deformations as described later.

Figure 4:
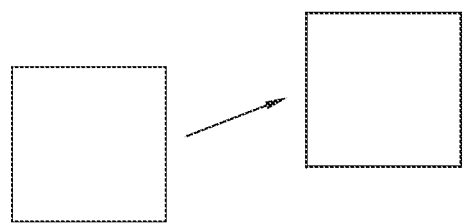
FIG. 4 illustratively shows motions which are expressed through the affine motion model.
Figure 4:
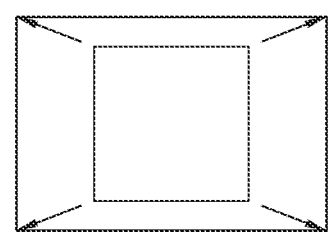
Figure 4:
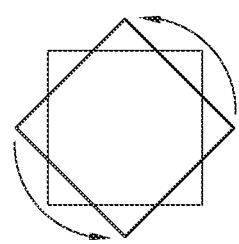
Figure 4:
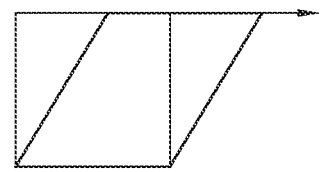

FIG. 4 illustratively shows motions which are expressed through the affine motion model. Referring to FIG. 3, the motions which can be expressed through the affine motion model may include a translate motion, a scale motion, a rotate motion and a shear motion. That is, as shown in FIG. 4, the translate motion that an image (or a part thereof) is moved in a plane over time, the scale motion that an image (or a part thereof) is scaled over time, the rotate motion that an image (or a part thereof) is rotated over time, and the shear motion that an image (or a part thereof) is deformed to a parallelogram over time may be efficiently expressed through the affine inter prediction.

The encoding apparatus/decoding apparatus may predict distortion shape of the image based on motion vectors at control points (CP) of the current block through the affine inter prediction, which can lead to increase in prediction accuracy, thus improving compression performance of an image. Further, by using the motion vector of the neighboring block of the current block, a motion vector for at least one control point of the current block may be derived, and thus it is possible to reduce data amount of added additional information, and considerably improve inter prediction efficiency.

As an example of the affine inter prediction, motion information at three control points, that is, three reference points may be required.

Figure 5:
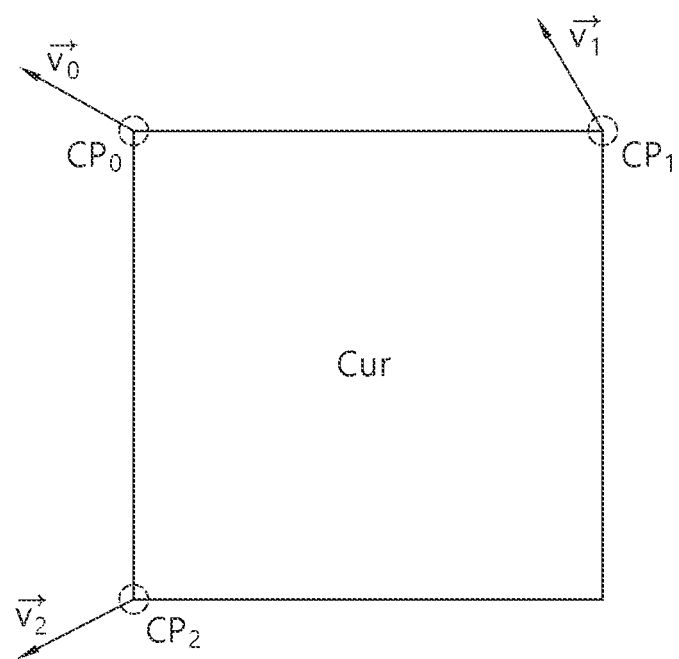
FIG. 5 illustratively shows the affine motion model in which motion vectors for three control points are used.

FIG. 5 illustratively shows the affine motion model in which motion vectors for three control points are used.

If a top-left sample position in the current block 500 is set as (0,0), as shown in FIG. 5, sample positions (0,0), (w,0), (0,h) may be determined as the control points. Hereinafter, the control point of (0,0) sample position may be represented as CP0; the control point of (w,0) sample position, CP1; and the control point of (0,h) sample position, CP2.

By using each of the above-described control points and the motion vector for the corresponding control point, an equation for the affine motion model may be derived. The equation for the affine motion model may be represented as below:

$$\begin{cases} v_x = \frac{(v_{1x} - v_{0x})}{w} * x + \frac{(v_{2x} - v_{0x})}{h} * y + v_{0x} \\ v_y = \frac{(v_{1y} - v_{0y})}{w} * x - \frac{(v_{2y} - v_{0y})}{h} * y + v_{0y} \end{cases}$$ [Equation 1]

where w represents a width of the current block 400; h, a height of the current block 500; $v_{0x}$ and $v_{0y}$, an x component and y component of the motion vector of CP0, respectively; $v_{1x}$ and $v_{1y}$, an x component and y component of the motion vector of CP1, respectively; and $v_{2x}$ and $v_{2y}$, an x component and y component of the motion vector of CP2, respectively. Further, x represents an x component of a position of a target sample in the current block 500; y, a y component of the position of the target sample in the current block 500; $v_x$, an x component of a motion vector of the target sample in the current block 500; and $v_y$, a y component of the motion vector of the target sample in the current block 500.

Since the motion vector of CP0, the motion vector of CP1, and the motion vector of CP2 are known, the motion vector according to the sample position within the current block may be derived based on Equation 1 above. That is, according to the affine motion model, the motion vectors v0($v_{0x}$, $v_{0y}$), v1($v_{1x}$, $v_{1y}$), v2($v_{2x}$, $v_{2y}$) at the control points may be scaled based on ratios of distances between coordinates (x, y) of the target sample and three control points, so that the motion vector of the target sample according to the target sample position may be derived. That is, according to the affine motion model, the motion vector of each sample within the current block may be derived based on the motion vectors of the control points. Meanwhile, a set of the motion vectors of the samples in the current block which have been derived according to the affine motion model may be represented as an affine motion vector field (MVF).

Meanwhile, the six parameters for Equation 1 above may be expressed as a, b, c, d, e and f of following equations, and the equation for the affine motion model which is represented using the six parameters may be as below:

$$a = \frac{(v_{1x} - v_{0x})}{w}$$ [Equation 2]

$$b = \frac{(v_{2x} - v_{0x})}{h}$$

$$c = v_{0x}$$

$$d = \frac{(v_{1y} - v_{0y})}{w}$$

$$e = -\frac{(v_{2y} - v_{0y})}{h}$$

$$f = v_{0y}$$

-continued $$\begin{cases} v_x = a*x + b*y + c \\ v_y = d*x + e*y + f \end{cases}$$

where w represents a width of the current block 500; h, a height of the current block 500; $v_{0x}$ and $v_{0y}$, an x component and y component of the motion vector of CP0, respectively; $v_{1x}$ and $v_{1y}$, an x component and y component of the motion vector of CP1, respectively; and $v_{2x}$ and $v_{2y}$, an x component and y component of the motion vector of CP2, respectively. Further, x represents an x component of a position of a target sample in the current block 500; y, a y component of the position of the target sample in the current block 500; $v_x$, an x component of a motion vector of the target sample in the current block 500; and $v_y$, a y component of the motion vector of the target sample in the current block 500.

The affine motion model or the affine inter prediction using the six parameters may be referred to as a 6-parameter affine motion model or AF6.

Further, as an example of the affine inter prediction, motion information at two control points, that is, two reference points may be required.

Figure 6:
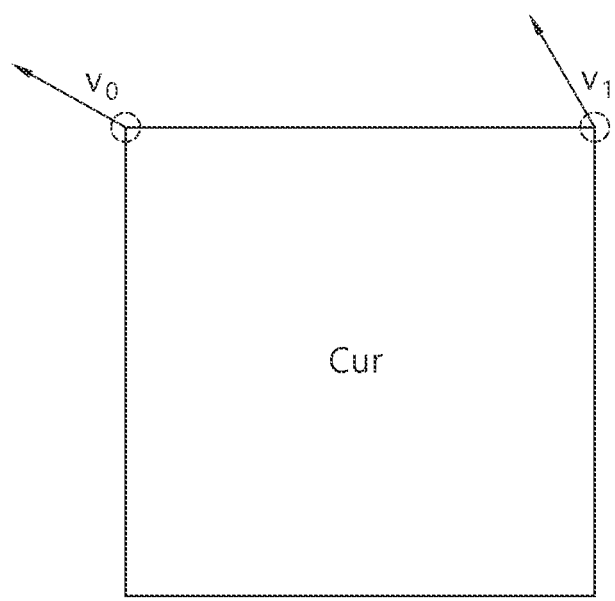
FIG. 6 illustratively shows the affine motion model in which motion vectors for two control points are used.

FIG. 6 illustratively shows the affine motion model in which motion vectors for two control points are used. The affine motion model using two control points may express three motions including the translate motion, the scale motion and the rotate motion. The affine motion model expressing three motions may be represented as a similarity affine motion model or a simplified affine motion model.

If a top-left sample position in the current block 600 is set as (0,0), as shown in FIG. 6, sample positions (0,0), (w,0) may be determined as the control points. Hereinafter, the control point of (0,0) sample position may be represented as CP0; and the control point of (w,0) sample position, CP1.

By using each of the above-described control points and the motion vector for the corresponding control point, an equation for the affine motion model may be derived. The equation for the affine motion model may be represented as below:

$$\begin{cases} v_x = \frac{(v_{1x} - v_{0x})}{w} * x - \frac{(v_{1y} - v_{0y})}{h} * y + v_{0x} \\ v_y = \frac{(v_{1y} - v_{0y})}{w} * x - \frac{(v_{1x} - v_{0x})}{h} * y + v_{0y} \end{cases}$$ [Equation 3]

where w represents a width of the current block 600; $v_{0x}$ and $v_{0y}$, an x component and y component of the motion vector of CP0, respectively; and $v_{1x}$ and $v_{1y}$, an x component and y component of the motion vector of CP1, respectively. Further, x represents an x component of a position of a target sample in the current block 600; y, a y component of the position of the target sample in the current block 600; $v_x$, an x component of a motion vector of the target sample in the current block 600; and $v_y$, a y component of the motion vector of the target sample in the current block 600.

Meanwhile, four parameters for Equation 3 above may be represented as a, b, c and d of following equations, and equation for the affine motion model which is represented using the four parameters may be as below:

$$a = \frac{(v_{1x} - v_{0x})}{w}$$ [Equation 4]

$$b = \frac{(v_{1y} - v_{0y})}{w}$$

$$c = v_{0x}$$

$$d = v_{0y}$$

$$\begin{cases} v_x = a*x - b*y + c \\ v_y = b*x + a*y + d \end{cases}$$

where w represents a width of the current block 600; $v_{0x}$ and $v_{0y}$, an x component and y component of the motion vector of CP0, respectively; and $v_{1x}$ and $v_{1y}$, an x component and y component of the motion vector of CP1, respectively. Further, x represents an x component of a position of a target sample in the current block 600; y, a y component of the position of the target sample in the current block 600; $v_x$, an x component of a motion vector of the target sample in the current block 600; and $v_y$, a y component of the motion vector of the target sample in the current block 600. Since the affine motion model using the two control points may be expressed with four parameters a, b, c and d as in Equation 4 above, the affine motion model or the affine inter prediction using the four parameters may be represented as 4-parameter affine motion model or AF4. That is, according to the affine motion model, the motion vector of each sample within the current block may be derived based on the motion vectors of the control points. Meanwhile, a set of the motion vectors of the samples in the current block derived according to the affine motion model may be represented as an affine motion vector field (MVF).

Meanwhile, as described above, the motion vector of the sample unit may be derived through the affine motion model, and the accuracy of inter prediction can be considerably improved through this. However, in this case, the complexity may be greatly increased in the motion compensation process.

Thus, it may be limited to derive the motion vector of the sub-block unit in the current block instead of the motion vector of the sample unit.

Figure 7:
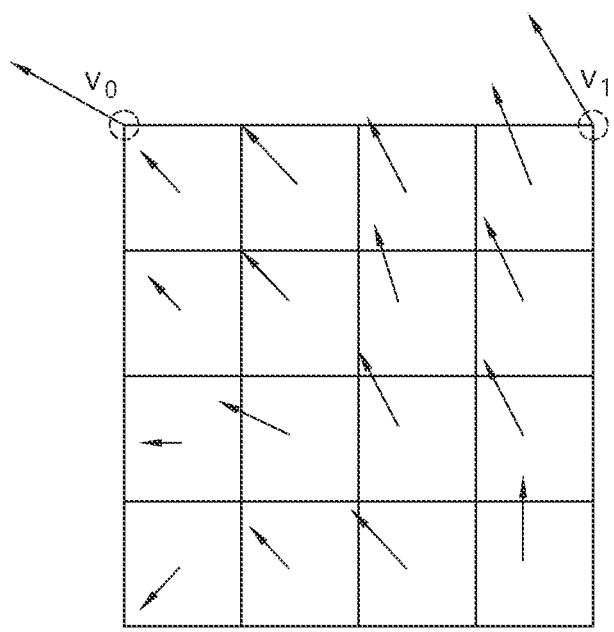
FIG. 7 illustratively shows a method of deriving a motion vector in a sub-block unit based on the affine motion model.

FIG. 7 illustratively shows a method of deriving a motion vector in a sub-block unit based on the affine motion model. FIG. 7 illustratively shows a case where the size of the current block is 16×16, and the motion vector is derived in 4×4 sub-block units. The sub-block may be set in various sizes, and for example, if the sub-block is set in an n×n size (n is a positive integer, and for example, n is 4), the motion vector may be derived in an n×n sub-block unit in the current block based on the affine motion model, and various methods for deriving a motion vector representing each sub-block may be applied.

For example, referring to FIG. 7, the motion vector of each sub-block may be derived setting a center or center lower right side sample position of each sub-block as representative coordinates. Here, the center lower right side position may represent a sample position located at a lower right side among four samples located at the center of the sub-block. For example, if n is an odd number, one sample may be located at the center of the sub-block, and in this case, the center sample position may be used for deriving the motion vector of the sub-block. However, if n is an even number, four samples may be located adjacent to the center of the sub-block, and in this case, the lower right side sample position may be used for deriving the motion vector. For example, referring to FIG. 7, representative coordinates for each of the sub-blocks may be derived as (2, 2), (6, 2), (10, 2), . . . , (14, 14), and the encoding apparatus/decoding apparatus may derive the motion vector of each sub-block by inputting each of the representative coordinates of the sub-blocks into Equations 1 to 3 above. Motion vectors of sub-blocks within the current block derived through the affine motion model may be referred to as affine MVF.

Meanwhile, as an example, the size of the sub-block in the current block may be derived based on the following equation:

$$\begin{cases} M = \text{clip3}\left(4, w, \dfrac{w * MvPre}{\max(\text{abs}(v_{1x} - v_{0x}), \text{abs}(v_{1y} - v_{0y}))}\right) \\ N = \text{clip3}\left(4, h, \dfrac{h * MvPre}{\max(\text{abs}(v_{2x} - v_{0x}), \text{abs}(v_{2y} - v_{0y}))}\right) \end{cases} \quad \text{[Equation 5]}$$

where M represents a width of the sub-block; and N, a height of the sub-block. Further, $v_{0x}$ and $v_{0y}$ represent an x component and y component of CPMV0 of the current block, respectively; $v_{0x}$ and $v_{0y}$, an x component and y component of CPMV1 of the current block, respectively; w, a width of the current block; h, a height of the current block; and MvPre, motion vector fraction accuracy. For example, the motion vector fraction accuracy may be set as $\frac{1}{16}$.

Meanwhile, in the inter prediction using above-described affine motion model, that is, the affine motion prediction, there may exist an affine merge mode (AF_MERGE) and an affine inter mode (AF_INTER). Here, the affine inter mode may be represented as an affine MVP mode (affine motion vector prediction mode, AF_MVP).

The affine merge mode is similar to the existing merge mode in that MVD for the motion vectors of the control points is not transmitted. That is, like the existing skip/merge mode, the affine merge mode may represent an encoding/decoding method which performs prediction by deriving CPMV for each of two or three control points from the neighboring block of the current block without coding for MVD (motion vector difference).

For example, if the AF_MRG mode is applied to the current block, MV for CP0 and CP1 (i.e., CPMV0 and CPMV1) may be derived from the neighboring block among the neighboring blocks of the current block, to which the affine mode has been applied. That is, CPMV0 and CPMV1 of the neighboring block to which the affine mode has been applied may be derived as the merge candidate, and the merge candidate may be derived as CPMV0 and CPMV1 for the current block.

The affine inter mode may represent inter prediction in which prediction based on affine MVF is performed by deriving MVP (motion vector predictor) for motion vectors of the control points, deriving motion vectors of the control points based on the MVP and received MVP, and deriving affine MVF of the current block based on the motion vectors of the control points. Here, the motion vector of the control point may be represented as CPMV (Control Point Motion Vector); MVP of the control point, CPMVP (Control Point Motion Vector Predictor); and MVD of the control point, CPMVD (Control Point Motion Vector Difference). Specifically, for example, the encoding apparatus may derive CPMVP (control point point motion vector predictor) and CPMV (control point point motion vector) for each of CP0 and CP1 (or CP0, CP1 and CP2), and may transmit or store information on the CPMVP and/or CPMVD which is a difference value between the CPMVP and CPMV.

Here, if the affine inter mode is applied to the current block, the encoding apparatus/decoding apparatus may construct an affine MVP candidate list based on the neighboring block of the current block, and the affine MVP candidate may be referred to as CPMVP pair candidate, and the affine MVP candidate list may be referred to as CPMVP candidate list.

Further, each affine MVP candidate may mean combination of CPMVPs of CP0 and CP1 in the four-parameter affine motion model, and may mean combination of CPMVPs of CP0, CP1 and CP2 in the six-parameter affine motion model.

Figure 8:
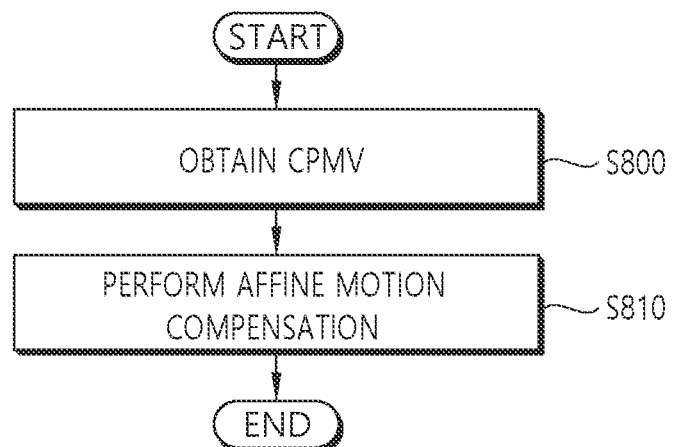
FIG. 8 illustratively shows a flowchart of an affine motion prediction method according to an embodiment of this document.

FIG. 8 illustratively shows a flowchart of an affine motion prediction method according to an embodiment of this document.

Referring to FIG. 8, the affine motion prediction method may be generally represented as below. When the affine motion prediction method is started, CPMV pair may be acquired first (S800). Here, if the four-parameter affine model is used, CPMV pair may include CPMV0 and CPMV1.

After this, affine motion compensation may be performed based on CPMV pair (S810), and the affine motion prediction may be ended.

Further, in order to determine the CPMV0 and the CPMV1, there may exist two affine prediction modes. Here, the two affine prediction modes include an affine inter mode and an affine merge mode. The affine inter mode may clearly determine CPMV0 and CPMV1 by signaling information on two-motion vector difference (MVD) for CPMV0 and CPMV1. Contrarily, the affine merge mode may derive CPMV pair without MVD information signaling.

In other words, the affine merge mode may derive CPMV of the current block by using CPMV of the neighboring block which has been coded in the affine mode, and, if the motion vector is determined in subblock units, the affine merge mode may be referred to as a sub-block merge mode.

In the affine merge mode, the encoding apparatus may signal to the decoding apparatus an index for the neighboring block which has been coded in the affine mode for deriving CPMV of the current block, and may further signal a difference value between the CPMV of the neighboring block and the CPMV of the current block. Here, the affine merge mode may construct an affine merge candidate list based on the neighboring block, and the index for the neighboring block may represent the neighboring block among the merge candidate list, which is referred to for deriving CPMV of the current block. The affine merge candidate list may be referred to as a subblock merge candidate list.

The affine inter mode may be referred to as an affine MVP mode. In the affine MVP mode, CPMV of the current block may be derived based on CPMVP (Control Point Motion Vector Predictor) and CPMVD (Control Point Motion Vector Difference). In other words, the encoding apparatus may determine the CPMVP for CPMV of the current block, derive the CPMVD which is a difference value between the CPMV and the CPMVP of the current block, and signal information on the CPMVP and information on the CPMVD to the decoding apparatus. Here, the affine MVP mode may construct an affine MVP candidate list based on the neighboring block, and the information on CPMVP may represent the neighboring block among the affine MVP candidate list, which is referred to for deriving CPMVP for the CPMV of the current block. The affine MVP candidate list may be referred to as a control point motion vector predictor candidate list.

Meanwhile, for example, if the affine merge mode is applied to the current block, the current block may be coded as described later.

The encoding apparatus/decoding apparatus may construct an affine merge candidate list including affine merge candidates for the current block, and derive CPMVs (Control Point Motion Vectors) for CPs (control points) of the current block based on one of affine merge candidates of the affine merge candidate list. The encoding apparatus/decoding apparatus may derive prediction samples for the current block based on the CPMVs, and generate a reconstructed picture for the current block based on the derived prediction samples.

Specifically, the affine merge candidate list may be constructed as below.

Figure 9:
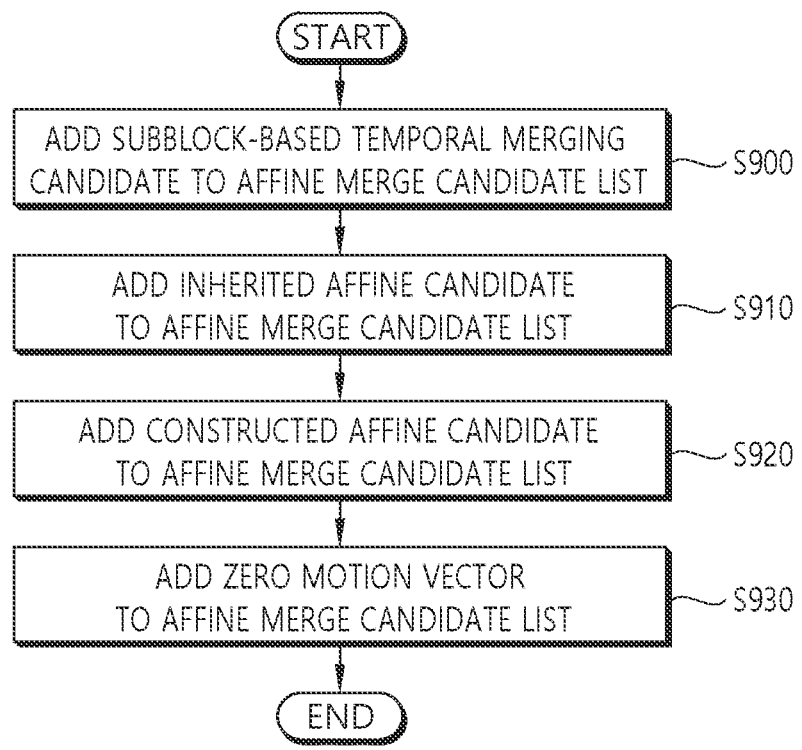
FIG. 9 represents an example of constructing the affine merge candidate list of the current block.

FIG. 9 represents an example of constructing the affine merge candidate list of the current block.

Referring to FIG. 9, the encoding apparatus may add a subblock-based temporal merging candidate to the affine merge candidate list (S900). Specifically, the encoding apparatus/decoding apparatus may be derived based on collocated sub-blocks of the collocated block in the reference picture. For example, the subblock-based temporal merging candidate may include sub-block unit motion informations derived based on motion informations of the collocated sub-blocks. The subblock-based temporal merging candidate may also be represented as a subblock-based temporal motion vector prediction candidate (SbTMVP) candidate. Further, the reference picture including the collocated block may be referred to as a collocated picture (colPic). Meanwhile, a detailed method for deriving the subblock-based temporal merging candidate will be described later.

Thereafter, the encoding apparatus/decoding apparatus may add an inherited affine candidate to the affine merge candidate list (S910).

Specifically, the encoding apparatus/decoding apparatus may derive the inherited affine candidate based on the neighboring blocks of the current block. Here, the neighboring blocks may include a bottom-left corner neighboring block A0, left neighboring block A1, top neighboring block B0, top-right corner neighboring block B1, and top-left corner neighboring block B2 of the current block.

Figure 10:
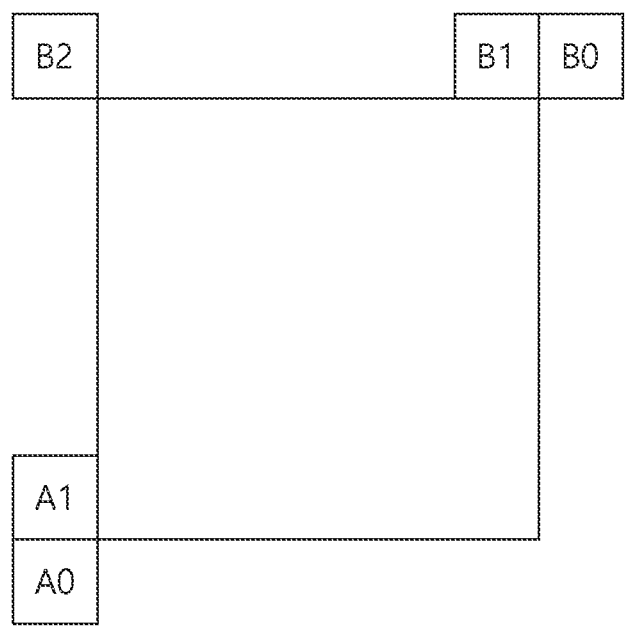
FIG. 10 illustratively shows neighboring blocks of the current block for deriving the inherited affine candidate.

FIG. 10 illustratively shows neighboring blocks of the current block for deriving the inherited affine candidate. Referring to FIG. 10, the neighboring blocks of the current block may include a bottom-left corner neighboring block A0 of the current block, a left neighboring block A1 of the current block, a top neighboring block B0 of the current block, a top-right corner neighboring block B1 of the current block, and a top-left corner neighboring block B2 of the current block.

For example, if the size of the current block is W×H, and an x component of the top-left sample position of the current block is 0 and a y component thereof is 0, then the left neighboring block may be a block including a sample at coordinates (−1, H−1); the top neighboring block, a block including a sample at coordinates (W−1, −1); the top-right corner neighboring block, a block including a sample at coordinates (W, −1); the bottom-left corner neighboring block, a block including a sample at coordinates (−1, H); and the top-left corner neighboring block, a block including a sample at coordinates (−1, −1).

The inherited affine candidate may be derived based on a significant neighboring reconstructed block which has been coded in the affine mode. For example, the encoding apparatus/decoding apparatus may check the neighboring blocks A0, A1, B0, B1 and B2 sequentially, and, if the neighboring block has been coded in the affine mode (that is, if the neighboring block is a neighboring block which has been significantly reconstructed by using the affine motion model), may derive two CPMVs or three CPMVs for the current block based on the affine motion model of the neighboring block, and the CPMVs may be derived as the inherited affine candidate of the current block. As an example, maximum five inherited affine candidates may be added into the affine merge candidate list. That is, the maximum five inherited affine candidates may be derived based on the neighboring blocks.

After this, the encoding apparatus/decoding apparatus may add a constructed affine candidate into the affine merge candidate list (S920).

For example, if the number of affine candidates of the affine merge candidate list is less than five, the constructed affine candidate may be added into the affine merge candidate list. The constructed affine candidate may represent an affine candidate which is generated by combining neighboring motion information on each of CPs of the current block (i.e., reference picture index and motion vector of the neighboring block). The motion information on each of CPs may be derived based on a spatial neighboring block or a temporal neighboring block for the corresponding CP. The motion information on each of the CPs may be represented as a candidate motion vector for the corresponding CP.

Figure 11:
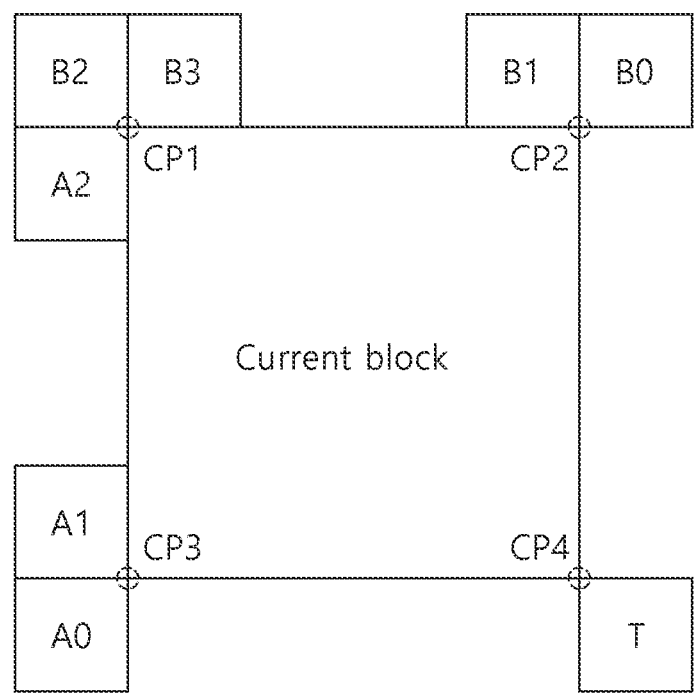
FIG. 11 illustratively shows neighboring blocks of the current block for deriving the constructed affine candidate.

FIG. 11 illustratively shows neighboring blocks of the current block for deriving the constructed affine candidate.

Referring to FIG. 11, the neighboring blocks may include spatial neighboring blocks and a temporal neighboring block. The spatial neighboring blocks may include a neighboring block A0, a neighboring block A1, a neighboring block A2, a neighboring block B0, a neighboring block B1, a neighboring block B2, and a neighboring block B3. A neighboring block T shown in FIG. 11 may represent the temporal neighboring block.

Here, the neighboring block B2 may represent a neighboring block located top left of a top-left sample position of the current block; the neighboring block B3, a neighboring block located top of the top-left sample position of the current block; and the neighboring block A2, a neighboring block located left of the top-left sample position of the current block. In addition, the neighboring block B1 may represent a neighboring block located top of the top-right sample position of the current block; and the neighboring block B0, a neighboring block located top right of the top-right sample position of the current block. In addition, the neighboring block A1 may represent a neighboring block located left of the bottom-left sample position of the current block; and the neighboring block A0, a neighboring block located bottom left of the bottom-left sample position of the current block.

Further, referring to FIG. 11, the CPs of the current block may include CP1, CP2, CP3 and/or CP4. The CP1 may represent a top-left position of the current block; the CP2, a top-right position of the current block; the CP3, a bottom-left position of the current block; and the CP4, a bottom-right position of the current block. For example, if the size of the current block is W×H, and x component of the top-left sample position of the current block is 0 and y component thereof is 0, then the CP1 may represent a position at coordinates (0, 0); the CP2, a position at coordinates (W, 0); the CP3, a position at coordinates (0, H); and the CP4, a position at coordinates (W, H). Meanwhile, the CP1 shown in FIG. 11 may represent the above-described CP0; the CP2 shown in FIG. 11, the above-described CP1; and the CP3 shown in FIG. 11, the above-described CP2.

A candidate motion vector for each of the forgoing CPs may be derived as below.

For example, the encoding apparatus/decoding apparatus may check neighboring blocks in a first group in a first order whether it is available, and may derive as a candidate motion vector for the CP1 a motion vector of the neighboring block which is first confirmed to be available during the check process. That is, the candidate motion vector for the CP1 may be a motion vector of the neighboring block which is first confirmed to be available while checking neighboring blocks in the first group in the first order. The being available may represent existence of a motion vector of the neighboring block. That is, the available neighboring block may be a block which has been coded in inter prediction (that is, a block to which the inter prediction has been applied). Here, for example, the first group may include the neighboring block B2, the neighboring block B3 and the neighboring block A2. The first order may be an order from the neighboring block B2 to the neighboring block B3, and then to the neighboring block A2 in the first group. As an example, if the neighboring block B2 is available, the motion vector of the neighboring block B2 may be derived as the candidate motion vector for the CP1; if the neighboring block B2 is not available and the neighboring block B3 is available, the motion vector of the neighboring block B3 may be derived as the candidate motion vector for the CP1; and if none of the neighboring blocks B2 and B3 is available and the neighboring block A2 is available, the motion vector of the neighboring block A2 may be derived as the candidate motion vector for the CP1.

Further, for example, the encoding apparatus/decoding apparatus may check neighboring blocks in a second group in a second order whether it is available, and may derive as a candidate motion vector for the CP2 a motion vector of the neighboring block which is first confirmed to be available during the check process. That is, the candidate motion vector for the CP2 may be a motion vector of the neighboring block which is first confirmed to be available while checking neighboring blocks in the second group in the second order. The being available may represent existence of a motion vector of the neighboring block. That is, the available neighboring block may be a block which has been coded in inter prediction (that is, a block to which the inter prediction has been applied). Here, the second group may include the neighboring block B1 and the neighboring block B0. The second order may be an order from the neighboring block B1 to the neighboring block B0 in the second group. As an example, if the neighboring block B1 is available, the motion vector of the neighboring block B1 may be derived as the candidate motion vector for the CP2; and if the neighboring block B1 is not available and the neighboring block B0 is available, the motion vector of the neighboring block B0 may be derived as the candidate motion vector for the CP2.

Further, for example, the encoding apparatus/decoding apparatus may check neighboring blocks in a third group in a third order whether it is available, and may derive as a candidate motion vector for the CP3 a motion vector of the neighboring block which is first confirmed to be available during the check process. That is, the candidate motion vector for the CP3 may be a motion vector of the neighboring block which is first confirmed to be available while checking neighboring blocks in the third group in the third order. The being available may represent existence of a motion vector of the neighboring block. That is, the available neighboring block may be a block which has been coded in inter prediction (that is, a block to which the inter prediction has been applied). Here, the third group may include the neighboring block A1 and the neighboring block A0. The third order may be an order from the neighboring block A1 to the neighboring block A0 in the third group. As one example, if the neighboring block A1 is available, the motion vector of the neighboring block A1 may be derived as the candidate motion vector for the CP3; and if the neighboring block A1 is not available and the neighboring block A0 is available, the motion vector of the neighboring block A0 may be derived as the candidate motion vector for the CP3.

Further, for example, the encoding apparatus/decoding apparatus may check the temporal neighboring block (i.e., the neighboring block T) whether it is available, and if the temporal neighboring block (i.e., the neighboring block T) is available, a motion vector of the temporal neighboring block (i.e., the neighboring block T) may be derived as a candidate motion vector for the CP4.

Combination of the candidate motion vector for the CP1, the candidate motion vector for the CP2, the candidate motion vector for the CP3, and/or the candidate motion vector for the CP4 may be derived as a constructed candidate.

For example, as described above, the 6-affine model needs motion vectors of three CPs. Three CPs may be selected from among the CP1, the CP2, the CP3 and the CP4 for the 6-affine model. For example, the CPs may be selected as one of {CP1, CP2, CP4}, {CP1, CP2, CP3}, {CP2, CP3, CP4}, and {CP1, CP3, CP4}. As an example, the 6-affine model may be constructed using CP1, CP2, and CP3. In this case, the CPs may be represented as the {CP1, CP2, CP3}.

Further, for example, as described above, the 4-affine model needs motion vectors of two CPs. Two CPs may be selected from among the CP1, the CP2, the CP3 and the CP4 for the 4-affine model. For example, the CPs may be selected as one of {CP1, CP4}, {CP2, CP3}, {CP1, CP2}, {CP2, CP4}, {CP1, CP3}, and {CP3, CP4}. As an example, the 4-affine model may be constructed using CP1 and CP2. In this case, the CPs may be represented as the {CP1, CP2}.

The constructed affine candidate, which is combinations of candidate motion vectors, may be added into the affine merge candidate list in the following order. That is, after candidate motion vectors for the CPs have been derived, the constructed affine candidate may be derived in the following order:

{CP1, CP2, CP3}, {CP1, CP2, CP4}, {CP1, CP3, CP4}, {CP2, CP3, CP4}, {CP1, CP2}, {CP1, CP3}, {CP2, CP3}, {CP1, CP4}, {CP2, CP4}, {CP3, CP4}

That is, for example, a constructed affine candidate including a candidate motion vector for the CP1, a candidate motion vector for the CP2 and a candidate motion vector for the CP3, a constructed affine candidate including a candidate motion vector for the CP1, a candidate motion vector for the CP2 and a candidate motion vector for the CP4, a constructed affine candidate including a candidate motion vector for the CP1, a candidate motion vector for the CP3 and a candidate motion vector for the CP4, a constructed affine candidate including a candidate motion vector for the CP2, a candidate motion vector for the CP3 and a candidate motion vector for the CP4, a constructed affine candidate including a candidate motion vector for the CP1 and a candidate motion vector for the CP2, a constructed affine candidate including a candidate motion vector for the CP1 and a candidate motion vector for the CP3, a constructed affine candidate including a candidate motion vector for the CP2 and a candidate motion vector for the CP3, a constructed affine candidate including a candidate motion vector for the CP1 and a candidate motion vector for the CP4, a constructed affine candidate including a candidate motion vector for the CP2 and a candidate motion vector for the CP4, and a constructed affine candidate including a candidate motion vector for the CP3 and a candidate motion vector for the CP4 may be added into the merge candidate list in this order.

Thereafter, the encoding apparatus/decoding apparatus may add 0 motion vectors as affine candidates to the affine merge candidate list (S930).

For example, if the number of affine candidates of the affine merge candidate list is less than 5, the affine candidate including 0 motion vectors may be added into the affine merge candidate list until the affine merge candidate list is constructed with the maximum number of affine candidates. The maximum number of the affine candidates may be five. Further, the 0 motion vector may represent a motion vector whose vector value is 0.

Meanwhile, the above-described subblock-based temporal merging candidate may be derived as follows.

First, in order to derive the subblock-based temporal merging candidate, the encoding apparatus/decoding apparatus may select one from among motion vectors of (spatial) neighboring blocks of the current block. The motion vectors may be candidates included in the merge candidate list of the existing inter prediction.

Figure 12:
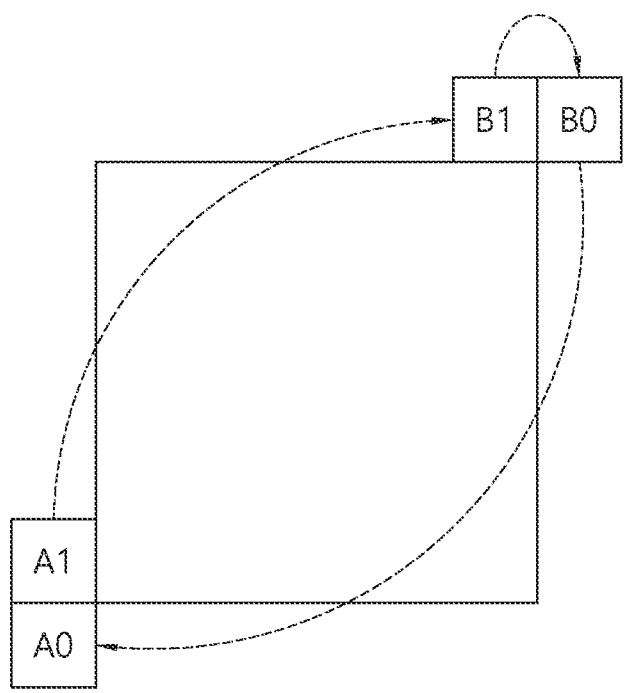
FIG. 12 illustratively shows a process of checking neighboring blocks for deriving the subblock-based temporal merging candidate.

FIG. 12 illustratively shows a process of checking neighboring blocks for deriving the subblock-based temporal merging candidate. Referring to FIG. 12, in order to derive the subblock-based temporal merging candidate, a merge candidate list of existing inter prediction may be derived. The process of checking whether the neighboring blocks are available to construct the merge candidate list is performed in the order of the left neighboring block A1, the top neighboring block B1, the top-right corner neighboring block B0, and the bottom-left corner neighboring block A0 of the current block.

Referring to FIG. 12, the (spatial) neighboring blocks may include a left neighboring block, a bottom-left corner neighboring block, a top neighboring block, and a top-right corner neighboring block of the current block. For example, if the size of the current block is W×H, and an x component of the top-left sample position of the current block is a and a y component thereof is b, then the left neighboring block may be a block including a sample at coordinates (a−1, b+H−1); the top neighboring block, a block including a sample at coordinates (a+W−1, b−1); the top-right corner neighboring block, a block including a sample at coordinates (a+W, b−1); and the bottom-left corner neighboring block, a block including a sample at coordinates (a−1, b+H). The encoding apparatus/decoding apparatus may derive a merge candidate list based on the neighboring blocks, and may select one motion vector from the merge candidate list. Thereafter, the encoding apparatus/decoding apparatus may derive, as the collocated block, the reference block of the corrected position based on the selected motion vector in the collocated picture (colPic). The corrected position may be derived as coordinates obtained by adding the motion vector to the coordinates of the top-left position of the current block. Here, deriving the corrected position by adding the motion vector to the coordinates indicating the position of the current block may be referred to as a motion shift. In other words, the encoding apparatus/decoding apparatus may derive, as the collocated block, a reference block in the collocated picture at a position derived by applying the motion shift based on the motion vector at the position of the current block, and may derive the subblock-based temporal merging candidate based on motion information of sub-blocks in the collocated block. The encoding apparatus/decoding apparatus may derive the subblock-based temporal merging candidate based on motion information of collocated sub-blocks of positions derived based on the motion vector of the selected neighboring block at the positions of the sub-blocks of the current block.

Meanwhile, according to the existing method for deriving the subblock-based temporal merging candidate, a process of deriving a merge candidate list by checking a plurality of neighboring blocks as described above may be performed. However, when considering a plurality of neighboring blocks, the complexity of the process of deriving the sub-block-based temporal merging candidate may be greatly increased. For example, if the subblock-based temporal merging candidate would be derived based on the motion vector of the neighboring block of the last check order in the process of checking the plurality of neighboring blocks (that is, the worst case of the subblock-based temporal merging candidate process)), the computational complexity of the process of deriving the subblock-based temporal merging candidate may be greatly increased. Accordingly, the embodiment of this document proposes a method which uses one fixed neighboring block in the process of deriving the subblock-based temporal merging candidate, instead of considering the plurality of neighboring blocks. That is, the method proposed in the embodiment of this document can/may derive the subblock-based temporal merging candidate with reference to one fixed neighboring block in order to reduce complexity in the worst case.

In an embodiment, there may be proposed a method which uses the fixed left neighboring block of the current block in the process of deriving the subblock-based temporal merging candidate. Through this, the process of deriving a subblock-based temporal merging candidate from neighboring blocks other than the left neighboring block can be eliminated.

Figure 13:
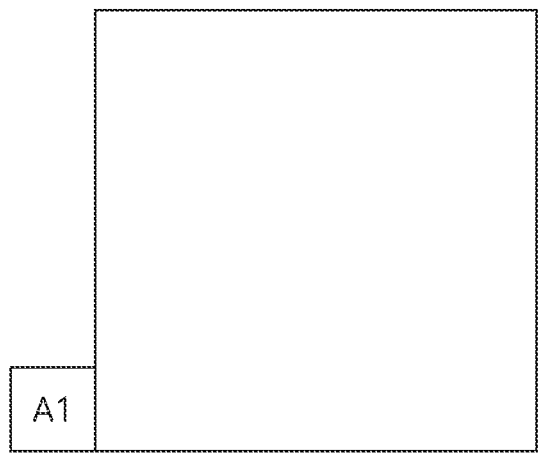
FIG. 13 illustratively shows a left neighboring block of the current block used to derive the subblock-based temporal merging candidate.

FIG. 13 illustratively shows a left neighboring block of the current block used to derive the subblock-based temporal merging candidate. Referring to FIG. 13, when the size of the current block is W×H, and an x component of a top-left sample position of the current block is a and a y component thereof is b, the left neighboring block is a block including a sample at (a−1, b+H−1) coordinates.

Figure 14:
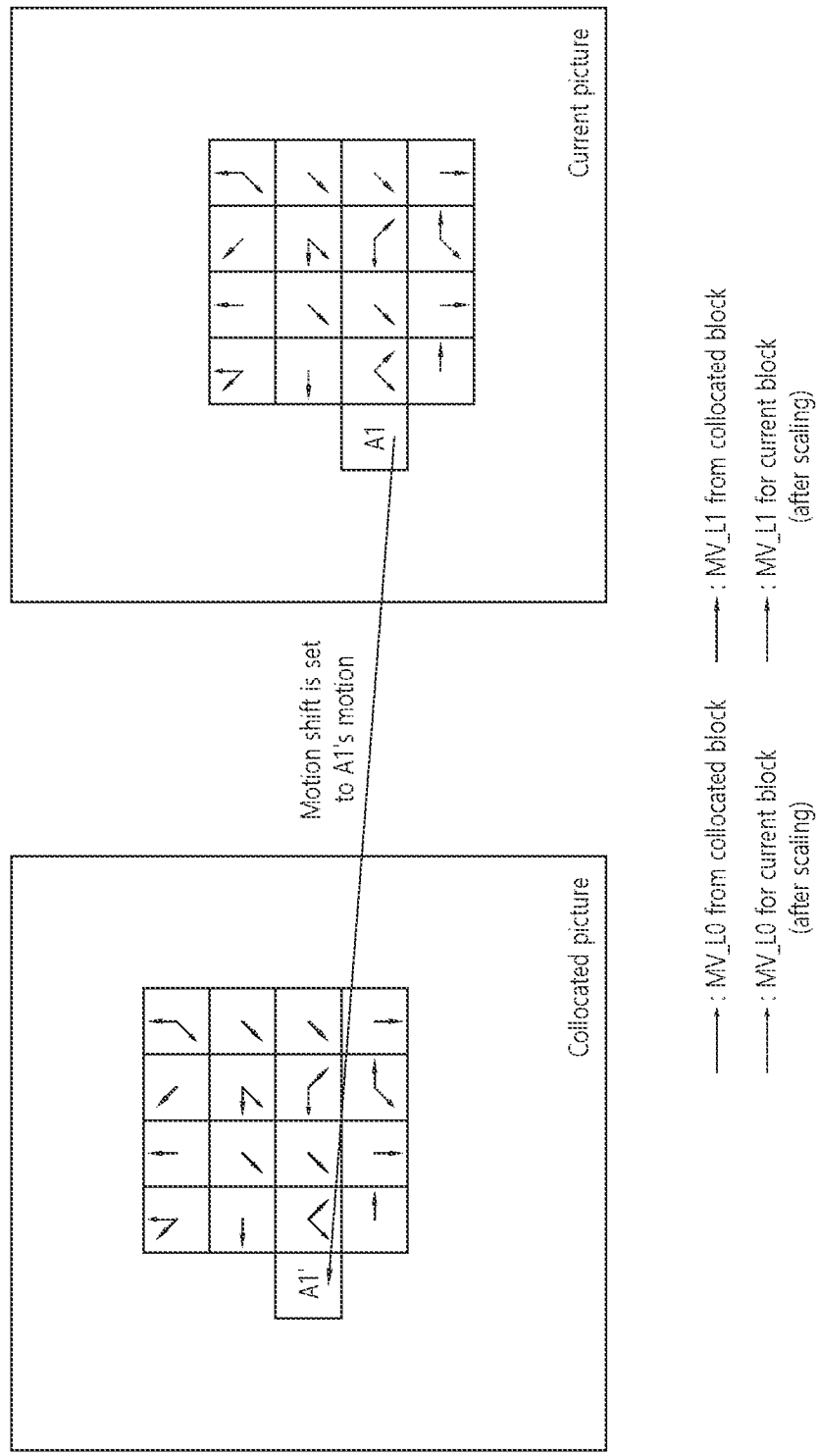
FIG. 14 shows an example of deriving the subblock-based temporal merging candidate based on the motion vector of the left neighboring block.

FIG. 14 shows an example of deriving the subblock-based temporal merging candidate based on the motion vector of the left neighboring block. Referring to FIG. 14, the encoding apparatus/decoding apparatus may derive the collocated sub-blocks in the collocated picture with the motion shift set through the motion vector of the left neighboring block of the current block, and may derive the subblock-based temporal merging candidate based on the collocated sub-blocks. The subblock-based temporal merging candidate may include a motion vector and a reference picture index in units of sub-blocks.

Figure 15:
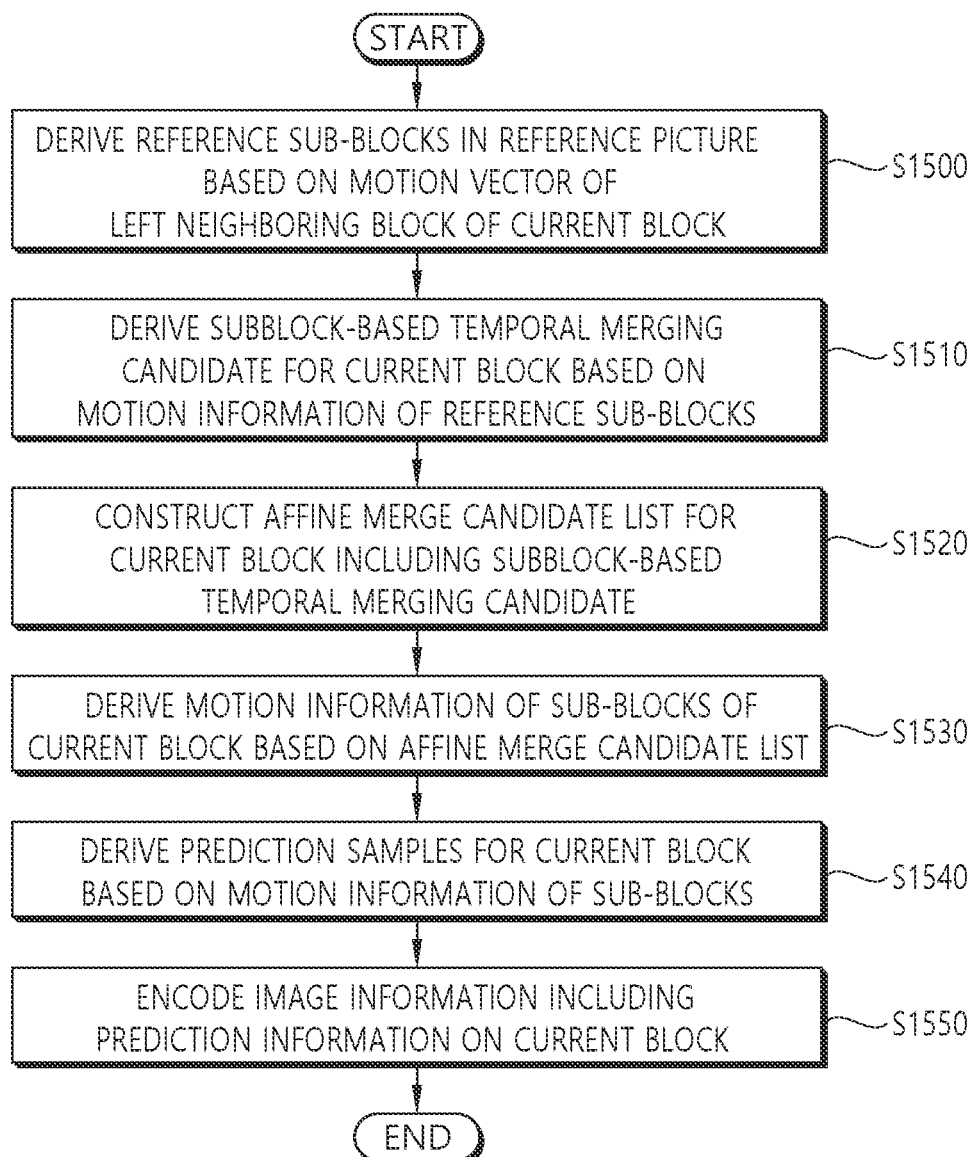
FIG. 15 schematically shows an image encoding method by an encoding apparatus according to this document.

FIG. 15 schematically shows an image encoding method by an encoding apparatus according to this document. The method disclosed in FIG. 15 may be performed by the encoding apparatus disclosed in FIG. 2. Specifically, S1500 to S1560 in FIG. 15 may be performed by the predictor of the encoding apparatus, and S1570 may be performed by the entropy encoder of the encoding apparatus. Further, although not shown in the drawings, the process of deriving a residual sample for the current block based on the original sample and the prediction sample for the current block may be performed by the subtractor of the encoding apparatus; the process of deriving reconstructed samples for the current block based on the residual samples and the prediction samples for the current block may be performed by the adder of the encoding apparatus; the process of generating residual information for the current block based on the residual sample may be performed by the transformer of the encoding apparatus; and the process of encoding the residual information may be performed by an entropy encoder of the encoding apparatus.

The encoding apparatus derives reference sub-blocks in a reference picture based on a motion vector of a left neighboring block of the current block (S1500). Here, the reference picture may be referred to as a collocated picture (colPic), and the reference sub-blocks may be referred to as collocated sub-blocks. The collocated picture to be described later may represent the reference picture, and the collocated sub-blocks may represent the reference sub-blocks.

The encoding apparatus may derive the collocated sub-blocks in the collocated picture based on the motion vector of the left neighboring block. When the size of the current block is W×H, and an x component of a top-left sample position of the current block is a and ay component thereof is b, the left neighboring block is a block including a sample at (a−1, b+H−1) coordinates.

Specifically, for example, the encoding apparatus may derive, as the collocated sub-blocks, blocks at the positions derived based on the positions of the sub-blocks of the current block and the motion vector. Here, the current block may include at least one sub-block. The positions of the collocated sub-blocks in the collocated picture may be derived by adding the motion vector to the positions of the sub-blocks. In other words, the x-coordinate of the position of the collocated sub-block for the target sub-block in the collocated picture may be derived with a value obtained by adding the x-coordinate of the position of the target sub-block with the x component of the motion vector of the left neighboring block, while the y-coordinate of the position of the collocated sub-block for the target sub-block in the collocated picture may be derived with a value obtained by adding the y-coordinate of the position of the target sub-block with they component of the motion vector of the left neighboring block.

Meanwhile, the process of deriving the collocated sub-blocks in the collocated picture based on the motion vector of the left neighboring block among neighboring blocks of the current block may not be performed. That is, the motion vector for deriving the positions of the reference sub-blocks may be fixed to the motion vector of the left neighboring block. Accordingly, a candidate list including motion vectors of spatial neighboring blocks other than the left neighboring blocks for deriving a subblock-based temporal merging candidate may not be constructed.

The encoding apparatus derives a subblock-based temporal merging candidate for the current block based on motion information of the reference sub-blocks (S1510).

The encoding apparatus may derive the subblock-based temporal merging candidate for the current block based on motion information of the collocated sub-blocks. The sub-block-based temporal merging candidate may include motion information of the collocated sub-blocks. Here, the motion information of the collocated sub-block may include a motion vector and a reference picture index.

The encoding apparatus constructs an affine merge candidate list for the current block including the subblock-based temporal merging candidate (S1520).

The encoding apparatus may construct the affine merge candidate list for the current block. The affine merge candidate list may include at least one candidate. The encoding apparatus may construct the affine merge candidate list for the current block including the subblock-based temporal merging candidate.

Meanwhile, when the affine merge candidate list includes a plurality of candidates, the affine merge candidate list may include the subblock-based temporal merging candidate as a first candidate. That is, when the affine merge candidate list includes a plurality of candidates, the affine merge candidate list may include the subblock-based temporal merging candidate as a candidate that is earliest in the order.

Additionally, as an example, when the affine merge candidate list includes a plurality of candidates, the encoding apparatus may add an inherited affine candidate and/or a constructed affine candidate to the affine merge candidate list. That is, the affine merge candidate list may include the inherited affine candidate and/or the constructed affine candidate.

As an example, the inherited affine candidate may be derived based on the neighboring blocks of the current block, and the maximum number of the inherited affine candidates may be two. For example, the inherited affine candidates may include a first inherited affine candidate and a second inherited affine candidate.

Specifically, the first inherited affine candidate may be derived based on a left block group including the bottom-left corner neighboring block and the left neighboring block of the current block. As an example, the neighboring blocks in the left block group may be checked in a first order, and the first inherited affine candidate may be derived based on the neighboring block which has been coded in an affine motion model, and which has been first checked. Here, the first order may be an order from the bottom-left corner neighboring block to the left neighboring block.

Further, the second inherited affine candidate may be derived based on a top block group including the top-right corner neighboring block, the top neighboring block, and the top-left corner neighboring block of the current block. As an example, the neighboring blocks in the top block group may be checked in a second order, and the second inherited affine candidate may be derived based on the neighboring block which has been coded in an affine motion model, and which has been first checked. Here, the second order may be an order from the top-right corner neighboring block to the top neighboring block, and then to the top-left corner neighboring block.

Meanwhile, if the size is W×H, and an x component of the top-left sample position of the current block is a and a y component thereof is b, then the bottom-left corner neighboring block may be a block including a sample at coordinates (a−1, b+H); the left neighboring block, a block including a sample at coordinates (a−1, b+H−1); the top-right corner neighboring block, a block including a sample at coordinates (a+W, b−1); the top neighboring block, a block including a sample at coordinates (a+W−1, b−1); and the top-left corner neighboring block, a block including a sample at coordinates (a−1, b−1). That is, the left neighboring block may be a left neighboring block among the left neighboring blocks of the current block, which is located lowermost, and the top neighboring block may be a top neighboring block among the top neighboring blocks of the current block, which is located leftmost.

Alternatively, as an example, the inherited affine candidate may be derived based on the neighboring block of the current block, and the maximum number of the inherited affine candidates may be one.

Specifically, as an example, the neighboring blocks may be checked in a certain order, and the inherited affine candidate may be derived based on the neighboring block which has been coded in an affine motion model, and which has been first checked. Here, the neighboring blocks may include a left neighboring block, a top neighboring block, a bottom-left corner neighboring block, a top-right corner neighboring block and a top-left corner neighboring block of the current block. Further, the certain order may be an order from the left neighboring block to the top neighboring block to the bottom-left corner neighboring block to the top-right corner neighboring block to the top-left corner neighboring block.

Alternatively, as an example, the inherited affine candidates may be derived based on the neighboring blocks of the current block, and the reference picture indexes of the inherited affine candidates may indicate reference pictures different from each other. For example, the neighboring blocks may be checked in a certain order, and the first inherited affine candidate may be derived based on the first neighboring block coded in an affine motion model. After this, if the reference picture index of the second neighboring block coded in the affine motion model, which follows the first neighboring block according to the certain order indicates the reference picture different from the reference picture index of the first neighboring block, the second inherited affine candidate may be derived based on the second neighboring block. If the reference picture index of the second neighboring block indicates the same reference picture as the reference picture index of the first neighboring block, no inherited affine candidate may be derived based on the second neighboring block.

Further, as an example, the constructed affine candidate may be derived based on the neighboring blocks of the current block.

For example, the candidate motion vectors for the control points (CPs) of the current block based on the neighboring blocks may be derived. Here, the CPs may include CP0, CP1, and CP2. The CP0 may represent a top-left position of the current block; the CP1, a top-right position of the current block; and the CP2, a bottom-left position of the current block. Further, the neighboring blocks may include a neighboring block A, a neighboring block B, a neighboring block C, a neighboring block D, a neighboring block E, a neighboring block F and a neighboring block G of the current block. If the size of the current block is W×H, and an x component of the top-left sample position of the current block is a and a y component thereof is b, the neighboring block A may be a block including a sample at coordinates (a−1, b−1); the neighboring block B, a block including a sample at coordinates (a, b−1); the neighboring block C, a block including a sample at coordinates (a−1, b); the neighboring block D, a block including a sample at coordinates (a+W−1, b−1); the neighboring block E, a block including a sample at coordinates (a+W, b−1); the neighboring block F, a block including a sample at coordinates (a−1, b+H−1); and the neighboring block G, a block including a sample at coordinates (a−1, b+H). That is, the neighboring block A may be the top-left corner neighboring block of the current block; the neighboring block B, the top neighboring block among the top neighboring blocks of the current block, which is located leftmost; the neighboring block C, the left neighboring block among the left neighboring blocks of the current block, which is located uppermost; the neighboring block D, the top neighboring block among the top neighboring blocks of the current block, which is located rightmost; the neighboring block E, the top-right corner neighboring block of the current block; the neighboring block F, the left neighboring block among the left neighboring blocks of the current block, which is located lowermost; and the neighboring block G, the bottom-left corner neighboring block of the current block.

Specifically, for example, neighboring blocks in a first group may be checked in a first order whether it is available, and a motion vector of the first neighboring block which has been first confirmed to be available may be derived as a candidate motion vector for the CP0. That is, the candidate motion vector for the CP0 may be derived as a motion vector of the first neighboring block which is first confirmed to be available while checking the neighboring blocks in the first group in the first order whether it is available. The availability may represent that the neighboring block has been coded in inter prediction. That is, the available neighboring block may be a block to which the inter prediction has been applied. Here, for example, the first group may include the neighboring block A, the neighboring block B and the neighboring block C. The first order may be an order from the neighboring block A to the neighboring block B, and then to the neighboring block C in the first group. As an example, if the neighboring block A is available, the motion vector of the neighboring block A may be derived as the candidate motion vector for the CP0; if the neighboring block A is not available and the neighboring block B is available, the motion vector of the neighboring block B, as the candidate motion vector for the CP0; and if none of the neighboring blocks A and B is available and the neighboring block C is available, the motion vector of the neighboring block C, as the candidate motion vector for the CP0.

Further, as an example, neighboring blocks in a second group may be checked in a second order whether it is available, and a motion vector of the second neighboring block which is first confirmed to be available may be derived as a candidate motion vector for the CP1. That is, the candidate motion vector for the CP1 may be derived as a motion vector of the second neighboring block which is first confirmed to be available while checking the neighboring blocks in the second group in the second order whether it is available. The availability may represent that the neighboring block has been coded in inter prediction. That is, the available neighboring block may be a block to which the inter prediction has been applied. Here, the second group may include the neighboring block D and the neighboring block E. The second order may be an order from the neighboring block D to the neighboring block E in the second group. As an example, if the neighboring block D is available, the motion vector of the neighboring block D may be derived as the candidate motion vector for the CP1, and if the neighboring block D is not available and the neighboring block E is available, the motion vector of the neighboring block E may be derived as the candidate motion vector for the CP1.

Further, as an example, neighboring blocks in a third group may be checked in a third order whether it is available, and a motion vector of the third neighboring block which is first confirmed to be available may be derived as a candidate motion vector for the CP2. That is, the candidate motion vector for the CP2 may be derived as a motion vector of the third neighboring block which is first confirmed to be available while checking the neighboring blocks in the third group in the third order whether it is available. The availability may represent that the neighboring block has been coded in inter prediction. That is, the available neighboring block may be a block to which the inter prediction has been applied. Here, the third group may include the neighboring block F and the neighboring block G. The third order may be an order from the neighboring block F to the neighboring block G in the third group. As an example, if the neighboring block F is available, the motion vector of the neighboring block F may be derived as the candidate motion vector for the CP2; and if the neighboring block F is not available and the neighboring block G is available, the motion vector of the neighboring block G may be derived as the candidate motion vector for the CP2.

After this, the constructed affine candidate may be derived based on the candidate motion vectors of the CPs.

For example, if the reference picture for the first neighboring block, the reference picture for the second neighboring block and the reference picture for the third neighboring block are the same, the constructed affine candidate may include a first constructed affine candidate including a candidate motion vector for CP1, a candidate motion vector for CP2, and a candidate motion vector for CP3. Alternatively, as an example, if the reference picture for the first neighboring block, the reference picture for the second neighboring block and the reference picture for the third neighboring block are the same, the constructed affine candidates may include the first constructed affine candidate, and a second constructed affine candidate including the candidate motion vector for the CP0 and the candidate motion vector for the CP1. Alternatively, as an example, if the reference picture for the first neighboring block, the reference picture for the second neighboring block and the reference picture for the third neighboring block are the same, the constructed affine candidates may include the first constructed affine candidate, the second constructed affine candidate, and a third constructed affine candidate including the candidate motion vector for the CP0 and the candidate motion vector for the CP2. Alternatively, as an example, if the reference picture for the first neighboring block, the reference picture for the second neighboring block and the reference picture for the third neighboring block are the same, the constructed affine candidates may include the first constructed affine candidate, the second constructed affine candidate, the third constructed affine candidate, and a fourth constructed affine candidate including the candidate motion vector for the CP1 and the candidate motion vector for the CP2.

Further, as an example, if the reference picture for the first neighboring block and the reference picture for the second neighboring block are the same, the constructed affine candidates may include the second constructed affine candidate including the candidate motion vector for the CP0 and the candidate motion vector for the CP1.

Further, as an example, if the reference picture for the first neighboring block and the reference picture for the third neighboring block are the same, the constructed affine candidates may include the third constructed affine candidate including the candidate motion vector for the CP0 and the candidate motion vector for the CP2.

Further, as an example, if the reference picture for the second neighboring block and the reference picture for the third neighboring block are the same, the constructed affine candidates may include the fourth constructed affine candidate including the candidate motion vector for the CP1 and the candidate motion vector for the CP2.

Further, if the number of the subblock-based temporal merging candidate, the inherited affine candidates and the constructed affine candidates is less than the maximum candidate number of the affine merge candidate list, that is, if the number of the derived affine candidates is less than the maximum candidate number, the affine merge candidate list may include a zero candidate. The zero candidate may include candidate motion vectors whose values for the CPs are 0, and a reference picture index whose value is 0. Alternatively, for example, if the number of the derived affine candidates is less than the maximum candidate number, a first zero candidate, a second zero candidate, a third zero candidate . . . a nth zero candidate may be added in this order to the affine merge candidate list until the number of affine candidates of the affine merge candidate list reaches the maximum candidate number. For example, the first zero candidate may include candidate motion vectors whose values are 0, L0 (list 0) reference picture index and L1 (list 1) reference picture index whose values are 0; the second zero candidate, candidate motion vectors whose values are 0, L0 reference picture index whose value is 0, and L1 reference picture index whose value is 1; the third zero candidate, candidate motion vectors whose values are 0, L0 reference picture index whose value is 1, and L1 reference picture index whose value is 0; and the fourth zero candidate, candidate motion vectors whose values are 0, L0 reference picture index whose value is 1, and L1 reference picture index whose value is 1. Alternatively, as an example, reference picture indexes of the neighboring block A, the neighboring block B, the neighboring block C, the neighboring block D, the neighboring block E, the neighboring block F, and neighboring block G may be included in the first zero candidate to the nth zero candidate in order of frequency (from highest to lowest). Alternatively, as an example, the first zero candidate may include candidate motion vectors whose values are 0, and a reference picture index whose value is the same as that of the reference picture index of the left neighboring block of the current block; the second zero candidate, candidate motion vectors whose values are 0, and a reference picture index whose value is the same as that of the reference picture index of the top neighboring block of the current block; the third zero candidate, candidate motion vectors whose values are 0, and a reference picture index whose value is the same as that of the reference picture index of the bottom-left corner neighboring block of the current block; the fourth zero candidate, candidate motion vectors whose values are 0, and a reference picture index whose value is the same as that of the reference picture index of the top-right corner neighboring block of the current block; and the fifth zero candidate, candidate motion vectors whose values are 0, and a reference picture index whose value is the same as that of the reference picture index of the top-left corner neighboring block of the current block.

The encoding apparatus derives motion information of sub-blocks of the current block based on the affine merge candidate list (S1530).

The encoding apparatus may derive motion information of sub-blocks of the current block based on the affine merge candidate list. For example, the encoding apparatus may select one candidate from among the candidates of the affine merge candidate list, and may derive motion information of sub-blocks of the current block based on the selected candidate.

As an example, the encoding apparatus may select the subblock-based temporal merging candidate from the affine merge candidate list, and may derive motion information of the sub-blocks of the current block based on the subblock-based temporal merging candidate. For example, the motion information of each sub-block of the sub-blocks may be derived based on the motion information of a collocated sub-block for said each sub-block included in the subblock-based temporal merging candidate. That is, the motion information of a target sub-block among the sub-blocks of the current block may be derived based on the motion information of a collocated sub-block for the target sub-block included in the subblock-based temporal merging candidate. In other words, the motion vector and reference picture index of the target sub-block of the current block may be derived based on the motion vector and the reference picture index of the collocated sub-block for the target sub-block included in the subblock-based temporal merging candidate. The collocated sub-block for the target sub-block may be a collocated sub-block at a position derived based on the position of the target sub-block and the motion vector of the left neighboring block.

Alternatively, as an example, the encoding apparatus may select the inherited affine candidate or the constructed affine candidate from the affine merge candidate list, and may derive the control point motion vectors (CPMVs) for the control points (CPs) of the current block based on the selected candidate.

Specifically, if the selected candidate includes the candidate motion vector for the CP0 and the candidate motion vector for the CP1, the candidate motion vector for CP0 of the selected candidate may be derived as CPMV of the CP0, and the candidate motion vector for CP1 of the selected candidate may be derived as CPMV of the CP1. Further, if the selected candidate includes the candidate motion vector for CP0, the candidate motion vector for CP1 and the candidate motion vector for CP2, the candidate motion vector for CP0 of the selected candidate may be derived as CPMV of the CP0, the candidate motion vector for CP1 of the selected candidate may be derived as CPMV of the CP1, and the candidate motion vector for CP2 of the selected candidate may be derived as CPMV of the CP2. In addition, if the selected candidate includes a candidate motion vector for CP0 and a candidate motion vector for CP2, the candidate motion vector for CP0 of the selected candidate may be derived as the CPMV of CP0, and the candidate motion vector for CP2 of the selected candidate may be derived as the CPMV of CP2.

Thereafter, the encoding apparatus may derive motion vectors of sub-blocks of the current block based on the CPMVs. That is, the encoding apparatus may derive a motion vector of each sub-block of the current block based on the CPMVs. The motion vectors of the sub-blocks may be derived based on Equation 1 or Equation 3 described above. The motion vectors may be represented as an affine motion vector field (MVF) or a motion vector array.

Meanwhile, as an example, the encoding apparatus may select the one candidate from among the affine candidates included in the affine merge candidate list based on a rate-distortion (RD) cost (or RDO), and may encode a candidate index indicating the candidate. The candidate index may indicate the one candidate among the candidates included in the affine merge candidate list for the current block. The image information may include prediction information for the current block, and the prediction information may include the candidate index.

The encoding apparatus derives prediction samples for the current block based on the motion information of the sub-blocks (S1540). The encoding apparatus may derive prediction samples for the current block based on the motion information of the sub-blocks. The encoding apparatus may derive prediction samples for the current block by performing prediction based on the motion information of the sub-blocks. That is, the encoding apparatus may derive a reference region in a reference picture based on the motion information of the sub-blocks, and may generate a prediction sample for the sub-blocks of the current block based on the reconstructed sample in the reference region.

The encoding apparatus encodes image information including prediction information for the current block (S1550). The encoding apparatus may encode image information including prediction mode information on the current chroma block, and signal the encoded image information through a bitstream. That is, the encoding apparatus may output image information including prediction information on the current block in the form of a bitstream. The prediction information may include the candidate index. Additionally, the encoding apparatus may determine the prediction mode of the current block, and encode prediction mode information indicating the prediction mode. For example, the prediction mode information may indicate that affine prediction is applied to the current block. The prediction information for the current block may include the prediction mode information.

Meanwhile, although not shown, the encoding apparatus may derive residual samples for the current block based on original samples and prediction samples for the current block, generate residual information for the current block based on the residual samples, and encode the residual information. The image information may include the residual information. Further, the encoding apparatus may generate reconstructed samples for the current chroma block based on the prediction samples and the residual samples for the current block.

Meanwhile, the bitstream may be transmitted to the decoding apparatus through a network or a (digital) storage medium. Here, the network may include a broadcast network, a communication network and/or the like, and the digital storage medium may include various storage media, such as USB, SD, CD, DVD, Blu-ray, HDD, SSD, and the like.

Figure 16:
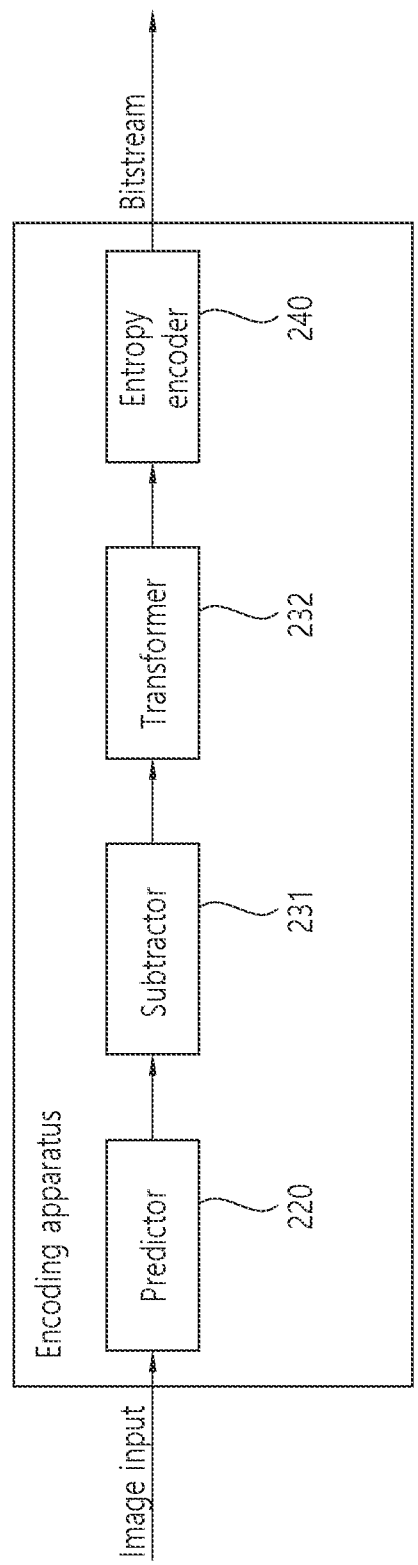
FIG. 16 schematically shows an encoding apparatus performing an image encoding method according to this document.

FIG. 16 schematically shows an encoding apparatus performing an image encoding method according to this document. The method disclosed in FIG. 15 may be performed by the encoding apparatus disclosed in FIG. 16. Specifically, for example, the predictor of the encoding apparatus of FIG. 16 may perform S1500 to S1540 of FIG. 15, and the entropy encoder of the encoding apparatus of FIG. 16 may perform S1550 of FIG. 15. Further, although not shown, the process of deriving residual samples for the current block based on the original samples and the prediction samples for the current block may be performed by the subtractor of the encoding apparatus in FIG. 16; the process of deriving reconstructed samples for the current block based on the residual samples and the prediction samples for the current block may be performed by the adder of the encoding apparatus in FIG. 16; the process of generating residual information for the current block based on the residual samples may be performed by the transformer of the encoding apparatus in FIG. 16; and the process of encoding the residual information may be performed by an entropy encoder of the encoding apparatus in FIG. 16.

Figure 17:
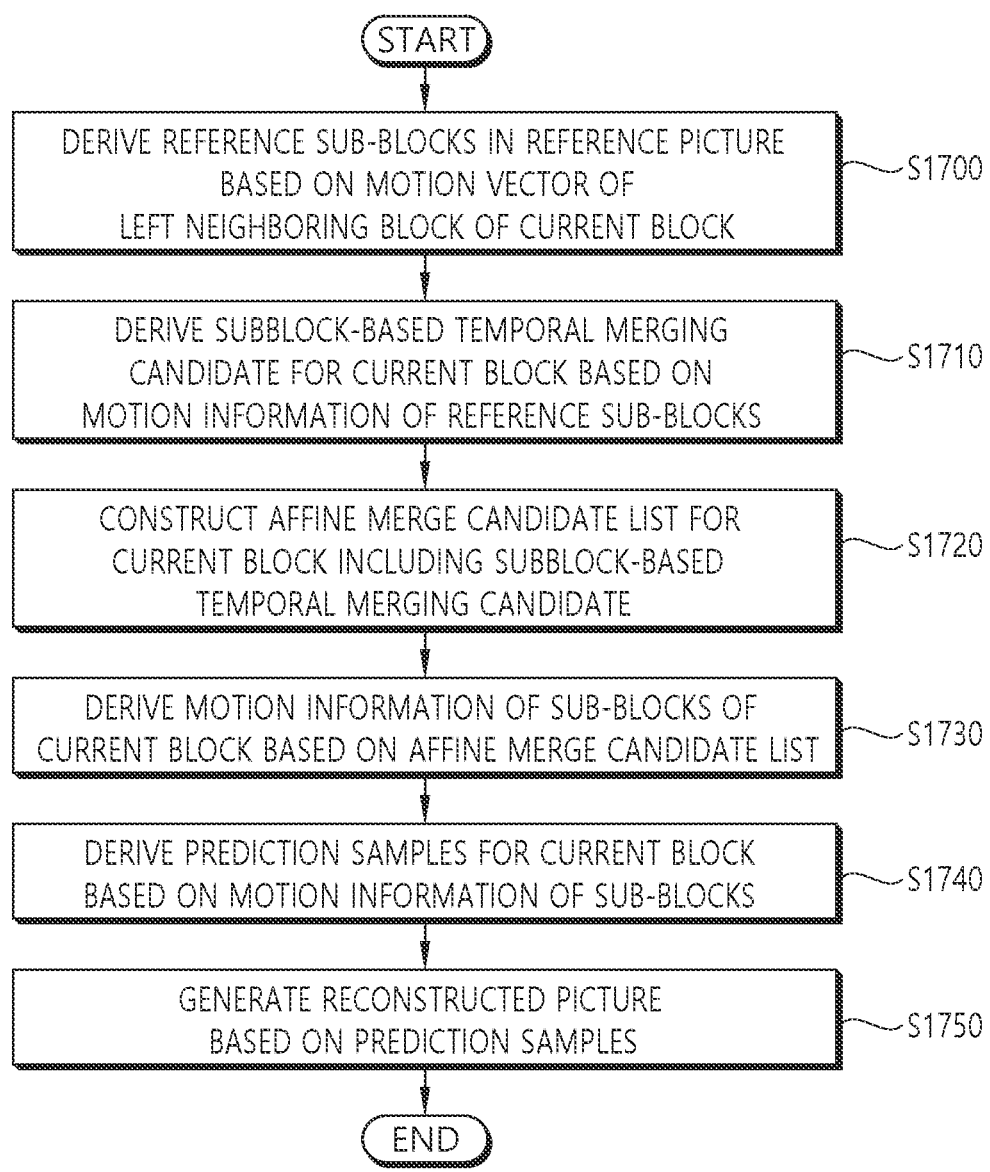
FIG. 17 schematically shows an image decoding method by a decoding apparatus according to this document.

FIG. 17 schematically shows an image decoding method by a decoding apparatus according to this document. The method disclosed in FIG. 17 may be performed by the decoding apparatus disclosed in FIG. 3. Specifically, for example, S1700 to S1740 of FIG. 17 may be performed by the predictor of the decoding apparatus, and S1750 may be performed by the adder of the decoding apparatus. Further, although not shown, the process of obtaining residual information of the current block through a bitstream may be performed by the entropy decoder of the decoding apparatus, and the process of deriving the residual sample for the current block based on the residual information may be performed by the inverse transformer of the decoding apparatus.

The decoding apparatus derives reference sub-blocks (collocated sub-blocks) in the reference picture based on the motion vector of the left neighboring block of the current block (S1700). Here, the reference picture may be referred to as a collocated picture (colPic), and the reference sub-blocks may be referred to as collocated sub-blocks. The collocated picture to be described later may represent the reference picture, and the collocated sub-blocks may represent the reference sub-blocks.

The decoding apparatus may derive the collocated sub-blocks in the collocated picture based on the motion vector of the left neighboring block. When the size of the current block is W×H, and an x component of a top-left sample position of the current block is a and ay component thereof is b, the left neighboring block is a block including a sample at (a−1, b+H−1) coordinates.

Specifically, for example, the decoding apparatus may derive, as the collocated sub-blocks, blocks at the positions derived based on the positions of the sub-blocks of the current block and the motion vector. Here, the current block may include at least one sub-block. The positions of the collocated sub-blocks in the collocated picture may be derived by adding the motion vector to the positions of the sub-blocks. In other words, the x-coordinate of the position of the collocated sub-block for the target sub-block in the collocated picture may be derived with a value obtained by adding the x-coordinate of the position of the target sub-block with the x component of the motion vector of the left neighboring block, while the y-coordinate of the position of the collocated sub-block for the target sub-block in the collocated picture may be derived with a value obtained by adding the y-coordinate of the position of the target sub-block with they component of the motion vector of the left neighboring block.

Meanwhile, the process of deriving the collocated sub-blocks in the collocated picture based on the motion vector of the left neighboring block among neighboring blocks of the current block may not be performed. That is, the motion vector for deriving the positions of the reference sub-blocks may be fixed to the motion vector of the left neighboring block. Accordingly, a candidate list including motion vectors of spatial neighboring blocks other than the left neighboring blocks for deriving a subblock-based temporal merging candidate may not be constructed.

The decoding apparatus derives a subblock-based temporal merging candidate for the current block based on motion information of the reference sub-blocks (S1710).

The decoding apparatus may derive the subblock-based temporal merging candidate for the current block based on motion information of the collocated sub-blocks. The subblock-based temporal merging candidate may include motion information of the collocated sub-blocks. Here, the motion information of the collocated sub-block may include a motion vector and a reference picture index.

The decoding apparatus constructs an affine merge candidate list for the current block including the subblock-based temporal merging candidate (S1720).

The decoding apparatus may construct the affine merge candidate list for the current block. The affine merge candidate list may include at least one candidate. The decoding apparatus may construct the affine merge candidate list for the current block including the subblock-based temporal merging candidate.

Meanwhile, when the affine merge candidate list includes a plurality of candidates, the affine merge candidate list may include the subblock-based temporal merging candidate as a first candidate. That is, when the affine merge candidate list includes a plurality of candidates, the affine merge candidate list may include the subblock-based temporal merging candidate as a candidate that is earliest in the order.

Additionally, as an example, when the affine merge candidate list includes a plurality of candidates, the decoding apparatus may add an inherited affine candidate and/or a constructed affine candidate to the affine merge candidate list. That is, the affine merge candidate list may include the inherited affine candidate and/or the constructed affine candidate.

As an example, the inherited affine candidate may be derived based on the neighboring blocks of the current block, and the maximum number of the inherited affine candidates may be two. For example, the inherited affine candidates may include a first inherited affine candidate and a second inherited affine candidate.

Specifically, the first inherited affine candidate may be derived based on a left block group including the bottom-left corner neighboring block and the left neighboring block of the current block. As an example, the neighboring blocks in the left block group may be checked in a first order, and the first inherited affine candidate may be derived based on the neighboring block which has been coded in an affine motion model, and which has been first checked. Here, the first order may be an order from the bottom-left corner neighboring block to the left neighboring block.

Further, the second inherited affine candidate may be derived based on a top block group including the top-right corner neighboring block, the top neighboring block, and the top-left corner neighboring block of the current block. As an example, the neighboring blocks in the top block group may be checked in a second order, and the second inherited affine candidate may be derived based on the neighboring block which has been coded in an affine motion model, and which has been first checked. Here, the second order may be an order from the top-right corner neighboring block to the top neighboring block, and then to the top-left corner neighboring block.

Meanwhile, if the size is W×H, and an x component of the top-left sample position of the current block is a and a y component thereof is b, then the bottom-left corner neighboring block may be a block including a sample at coordinates (a−1, b+H); the left neighboring block, a block including a sample at coordinates (a−1, b+H−1); the top-right corner neighboring block, a block including a sample at coordinates (a+W, b−1); the top neighboring block, a block including a sample at coordinates (a+W−1, b−1); and the top-left corner neighboring block, a block including a sample at coordinates (a−1, b−1). That is, the left neighboring block may be a left neighboring block among the left neighboring blocks of the current block, which is located lowermost, and the top neighboring block may be a top neighboring block among the top neighboring blocks of the current block, which is located leftmost.

Alternatively, as an example, the inherited affine candidate may be derived based on the neighboring block of the current block, and the maximum number of the inherited affine candidates may be one.

Specifically, as an example, the neighboring blocks may be checked in a certain order, and the inherited affine candidate may be derived based on the neighboring block which has been coded in an affine motion model, and which has been first checked. Here, the neighboring blocks may include a left neighboring block, a top neighboring block, a bottom-left corner neighboring block, a top-right corner neighboring block and a top-left corner neighboring block of the current block. Further, the certain order may be an order from the left neighboring block to the top neighboring block to the bottom-left corner neighboring block to the top-right corner neighboring block to the top-left corner neighboring block.

Alternatively, as an example, the inherited affine candidates may be derived based on the neighboring blocks of the current block, and the reference picture indexes of the inherited affine candidates may indicate reference pictures different from each other. For example, the neighboring blocks may be checked in a certain order, and the first inherited affine candidate may be derived based on the first neighboring block coded in an affine motion model. After this, if the reference picture index of the second neighboring block coded in the affine motion model, which follows the first neighboring block according to the certain order indicates the reference picture different from the reference picture index of the first neighboring block, the second inherited affine candidate may be derived based on the second neighboring block. If the reference picture index of the second neighboring block indicates the same reference picture as the reference picture index of the first neighboring block, no inherited affine candidate may be derived based on the second neighboring block.

Further, as an example, the constructed affine candidate may be derived based on the neighboring blocks of the current block.

For example, the candidate motion vectors for the control points (CPs) of the current block based on the neighboring blocks may be derived. Here, the CPs may include CP0, CP1, and CP2. The CP0 may represent a top-left position of the current block; the CP1, a top-right position of the current block; and the CP2, a bottom-left position of the current block. Further, the neighboring blocks may include a neighboring block A, a neighboring block B, a neighboring block C, a neighboring block D, a neighboring block E, a neighboring block F and a neighboring block G of the current block. If the size of the current block is W×H, and an x component of the top-left sample position of the current block is a and a y component thereof is b, the neighboring block A may be a block including a sample at coordinates (a−1, b−1); the neighboring block B, a block including a sample at coordinates (a, b−1); the neighboring block C, a block including a sample at coordinates (a−1, b); the neighboring block D, a block including a sample at coordinates (a+W−1, b−1); the neighboring block E, a block including a sample at coordinates (a+W, b−1); the neighboring block F, a block including a sample at coordinates (a−1, b+H−1); and the neighboring block G, a block including a sample at coordinates (a−1, b+H). That is, the neighboring block A may be the top-left corner neighboring block of the current block; the neighboring block B, the top neighboring block among the top neighboring blocks of the current block, which is located leftmost; the neighboring block C, the left neighboring block among the left neighboring blocks of the current block, which is located uppermost; the neighboring block D, the top neighboring block among the top neighboring blocks of the current block, which is located rightmost; the neighboring block E, the top-right corner neighboring block of the current block; the neighboring block F, the left neighboring block among the left neighboring blocks of the current block, which is located lowermost; and the neighboring block G, the bottom-left corner neighboring block of the current block.

Specifically, for example, neighboring blocks in a first group may be checked in a first order whether it is available, and a motion vector of the first neighboring block which has been first confirmed to be available may be derived as a candidate motion vector for the CP0. That is, the candidate motion vector for the CP0 may be derived as a motion vector of the first neighboring block which is first confirmed to be available while checking the neighboring blocks in the first group in the first order whether it is available. The availability may represent that the neighboring block has been coded in inter prediction. That is, the available neighboring block may be a block to which the inter prediction has been applied. Here, for example, the first group may include the neighboring block A, the neighboring block B and the neighboring block C. The first order may be an order from the neighboring block A to the neighboring block B, and then to the neighboring block C in the first group. As an example, if the neighboring block A is available, the motion vector of the neighboring block A may be derived as the candidate motion vector for the CP0; if the neighboring block A is not available and the neighboring block B is available, the motion vector of the neighboring block B, as the candidate motion vector for the CP0; and if none of the neighboring blocks A and B is available and the neighboring block C is available, the motion vector of the neighboring block C, as the candidate motion vector for the CP0.

Further, as an example, neighboring blocks in a second group may be checked in a second order whether it is available, and a motion vector of the second neighboring block which is first confirmed to be available may be derived as a candidate motion vector for the CP1. That is, the candidate motion vector for the CP1 may be derived as a motion vector of the second neighboring block which is first confirmed to be available while checking the neighboring blocks in the second group in the second order whether it is available. The availability may represent that the neighboring block has been coded in inter prediction. That is, the available neighboring block may be a block to which the inter prediction has been applied. Here, the second group may include the neighboring block D and the neighboring block E. The second order may be an order from the neighboring block D to the neighboring block E in the second group. As an example, if the neighboring block D is available, the motion vector of the neighboring block D may be derived as the candidate motion vector for the CP1, and if the neighboring block D is not available and the neighboring block E is available, the motion vector of the neighboring block E may be derived as the candidate motion vector for the CP1.

Further, as an example, neighboring blocks in a third group may be checked in a third order whether it is available, and a motion vector of the third neighboring block which is first confirmed to be available may be derived as a candidate motion vector for the CP2. That is, the candidate motion vector for the CP2 may be derived as a motion vector of the third neighboring block which is first confirmed to be available while checking the neighboring blocks in the third group in the third order whether it is available. The availability may represent that the neighboring block has been coded in inter prediction. That is, the available neighboring block may be a block to which the inter prediction has been applied. Here, the third group may include the neighboring block F and the neighboring block G. The third order may be an order from the neighboring block F to the neighboring block G in the third group. As an example, if the neighboring block F is available, the motion vector of the neighboring block F may be derived as the candidate motion vector for the CP2; and if the neighboring block F is not available and the neighboring block G is available, the motion vector of the neighboring block G may be derived as the candidate motion vector for the CP2.

After this, the constructed affine candidate may be derived based on the candidate motion vectors of the CPs.

For example, if the reference picture for the first neighboring block, the reference picture for the second neighboring block and the reference picture for the third neighboring block are the same, the constructed affine candidate may include a first constructed affine candidate including a candidate motion vector for CP1, a candidate motion vector for CP2, and a candidate motion vector for CP3. Alternatively, as an example, if the reference picture for the first neighboring block, the reference picture for the second neighboring block and the reference picture for the third neighboring block are the same, the constructed affine candidates may include the first constructed affine candidate, and a second constructed affine candidate including the candidate motion vector for the CP0 and the candidate motion vector for the CP1. Alternatively, as an example, if the reference picture for the first neighboring block, the reference picture for the second neighboring block and the reference picture for the third neighboring block are the same, the constructed affine candidates may include the first constructed affine candidate, the second constructed affine candidate, and a third constructed affine candidate including the candidate motion vector for the CP0 and the candidate motion vector for the CP2. Alternatively, as an example, if the reference picture for the first neighboring block, the reference picture for the second neighboring block and the reference picture for the third neighboring block are the same, the constructed affine candidates may include the first constructed affine candidate, the second constructed affine candidate, the third constructed affine candidate, and a fourth constructed affine candidate including the candidate motion vector for the CP1 and the candidate motion vector for the CP2.

Further, as an example, if the reference picture for the first neighboring block and the reference picture for the second neighboring block are the same, the constructed affine candidates may include the second constructed affine candidate including the candidate motion vector for the CP0 and the candidate motion vector for the CP1.

Further, as an example, if the reference picture for the first neighboring block and the reference picture for the third neighboring block are the same, the constructed affine candidates may include the third constructed affine candidate including the candidate motion vector for the CP0 and the candidate motion vector for the CP2.

Further, as an example, if the reference picture for the second neighboring block and the reference picture for the third neighboring block are the same, the constructed affine candidates may include the fourth constructed affine candidate including the candidate motion vector for the CP1 and the candidate motion vector for the CP2.

Further, if the number of the subblock-based temporal merging candidate, the inherited affine candidates and the constructed affine candidates is less than the maximum candidate number of the affine merge candidate list, that is, if the number of the derived affine candidates is less than the maximum candidate number, the affine merge candidate list may include a zero candidate. The zero candidate may include candidate motion vectors whose values for the CPs are 0, and a reference picture index whose value is 0. Alternatively, for example, if the number of the derived affine candidates is less than the maximum candidate number, a first zero candidate, a second zero candidate, a third zero candidate . . . a nth zero candidate may be added in this order to the affine merge candidate list until the number of affine candidates of the affine merge candidate list reaches the maximum candidate number. For example, the first zero candidate may include candidate motion vectors whose values are 0, L0 (list 0) reference picture index and L1 (list 1) reference picture index whose values are 0; the second zero candidate, candidate motion vectors whose values are 0, L0 reference picture index whose value is 0, and L1 reference picture index whose value is 1; the third zero candidate, candidate motion vectors whose values are 0, L0 reference picture index whose value is 1, and L1 reference picture index whose value is 0; and the fourth zero candidate, candidate motion vectors whose values are 0, L0 reference picture index whose value is 1, and L1 reference picture index whose value is 1. Alternatively, as an example, reference picture indexes of the neighboring block A, the neighboring block B, the neighboring block C, the neighboring block D, the neighboring block E, the neighboring block F, and neighboring block G may be included in the first zero candidate to the nth zero candidate in order of frequency (from highest to lowest). Alternatively, as an example, the first zero candidate may include candidate motion vectors whose values are 0, and a reference picture index whose value is the same as that of the reference picture index of the left neighboring block of the current block; the second zero candidate, candidate motion vectors whose values are 0, and a reference picture index whose value is the same as that of the reference picture index of the top neighboring block of the current block; the third zero candidate, candidate motion vectors whose values are 0, and a reference picture index whose value is the same as that of the reference picture index of the bottom-left corner neighboring block of the current block; the fourth zero candidate, candidate motion vectors whose values are 0, and a reference picture index whose value is the same as that of the reference picture index of the top-right corner neighboring block of the current block; and the fifth zero candidate, candidate motion vectors whose values are 0, and a reference picture index whose value is the same as that of the reference picture index of the top-left corner neighboring block of the current block.

The decoding apparatus derives motion information of sub-blocks of the current block based on the affine merge candidate list (S1730).

The decoding apparatus may derive motion information of sub-blocks of the current block based on the affine merge candidate list. For example, the decoding apparatus may select one candidate from among the candidates of the affine merge candidate list, and may derive motion information of sub-blocks of the current block based on the selected candidate.

As an example, the decoding apparatus may select the subblock-based temporal merging candidate from the affine merge candidate list, and may derive motion information of the sub-blocks of the current block based on the subblock-based temporal merging candidate. For example, the motion information of each sub-block of the sub-blocks may be derived based on the motion information of a collocated sub-block for said each sub-block included in the subblock-based temporal merging candidate. That is, the motion information of a target sub-block among the sub-blocks of the current block may be derived based on the motion information of a collocated sub-block for the target sub-block included in the subblock-based temporal merging candidate. In other words, the motion vector and reference picture index of the target sub-block of the current block may be derived based on the motion vector and the reference picture index of the collocated sub-block for the target sub-block included in the subblock-based temporal merging candidate. The collocated sub-block for the target sub-block may be a collocated sub-block at a position derived based on the position of the target sub-block and the motion vector of the left neighboring block.

Alternatively, as an example, the decoding apparatus may select the inherited affine candidate or the constructed affine candidate from the affine merge candidate list, and may derive the control point motion vectors (CPMVs) for the control points (CPs) of the current block based on the selected candidate.

Specifically, if the selected candidate includes the candidate motion vector for the CP0 and the candidate motion vector for the CP1, the candidate motion vector for CP0 of the selected candidate may be derived as CPMV of the CP0, and the candidate motion vector for CP1 of the selected candidate may be derived as CPMV of the CP1. Further, if the selected candidate includes the candidate motion vector for CP0, the candidate motion vector for CP1 and the candidate motion vector for CP2, the candidate motion vector for CP0 of the selected candidate may be derived as CPMV of the CP0, the candidate motion vector for CP1 of the selected candidate may be derived as CPMV of the CP1, and the candidate motion vector for CP2 of the selected candidate may be derived as CPMV of the CP2. In addition, if the selected candidate includes a candidate motion vector for CP0 and a candidate motion vector for CP2, the candidate motion vector for CP0 of the selected candidate may be derived as the CPMV of CP0, and the candidate motion vector for CP2 of the selected candidate may be derived as the CPMV of CP2.

Thereafter, the decoding apparatus may derive motion vectors of sub-blocks of the current block based on the CPMVs. That is, the decoding apparatus may derive a motion vector of each sub-block of the current block based on the CPMVs. The motion vectors of the sub-blocks may be derived based on Equation 1 or Equation 3 described above. The motion vectors may be represented as an affine motion vector field (MVF) or a motion vector array.

Meanwhile, for example, the decoding apparatus may obtain a candidate index for the current block from a bitstream, and select a candidate indicated by the candidate index from among the candidates included in the affine merge candidate list. The decoding apparatus may acquire image information from the bitstream, and the image information may include the prediction information on the current block. The prediction information may include the candidate index.

The decoding apparatus derives prediction samples for the current block based on the motion information of the sub-blocks (S1740). The decoding apparatus may derive prediction samples for the current block based on the motion information of the sub-blocks. The decoding apparatus may derive prediction samples for the current block by performing prediction based on the motion information of the sub-blocks. That is, the decoding apparatus may derive a reference region in a reference picture based on the motion information of the sub-blocks, and may generate a prediction sample for the sub-blocks of the current block based on the reconstructed sample in the reference region.

The decoding apparatus generates a reconstructed picture based on the prediction samples (S1750). The decoding apparatus may generate the reconstructed picture based on the prediction samples. For example, the decoding apparatus may receive residual information for the current block from the bitstream. The residual information may include a transform coefficient related to the residual sample. The decoding apparatus may derive the residual sample (or residual sample array) for the current block based on the residual information. In this case, the decoding apparatus may generate the reconstructed samples based on the prediction samples and the residual samples. The decoding apparatus may derive a reconstructed block or a reconstructed picture based on the reconstructed samples. Thereafter, as described above, the decoding apparatus may apply an in-loop filtering procedure such as deblocking filtering and/or an SAO procedure to the reconstructed picture in order to improve subjective/objective video quality, as needed.

Figure 18:
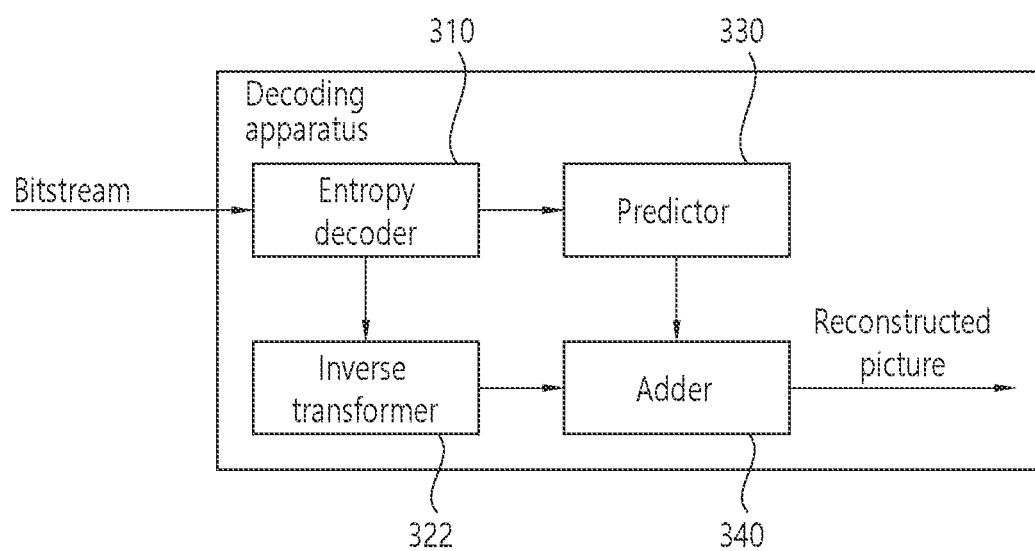
FIG. 18 schematically shows a decoding apparatus performing an image decoding method according to this document.

FIG. 18 schematically shows a decoding apparatus performing an image decoding method according to this document. The method disclosed in FIG. 17 may be performed by the decoding apparatus disclosed in FIG. 18. Specifically, for example, the predictor of the decoding apparatus of FIG. 18 may perform S1700 to S1740 of FIG. 17, and the adder of the decoding apparatus of FIG. 18 may perform S1750 of FIG. 17. Further, although not shown, the process of obtaining image information including residual information of the current block through a bitstream may be performed by the entropy decoder of the decoding apparatus of FIG. 18, and the process of deriving the residual samples for the current block based on the residual information may be performed by the inverse transformer of the decoding apparatus of FIG. 18.

According to this document described above, it is possible to improve overall image/video compression efficiency.

Further, according to this document, it is possible to reduce operational complexity of the affine merge mode, which can lead to generally improved efficiency of image coding.

In addition, according to this document, a subblock-based temporal merging candidate can be derived by referring only to a motion vector of a left neighboring block among neighboring blocks of the current block, and through this, it is possible to reduce the operational complexity of a process of deriving a subblock-based temporal merging candidate and the process of constructing the merge candidate list, and improve the coding efficiency.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 19:
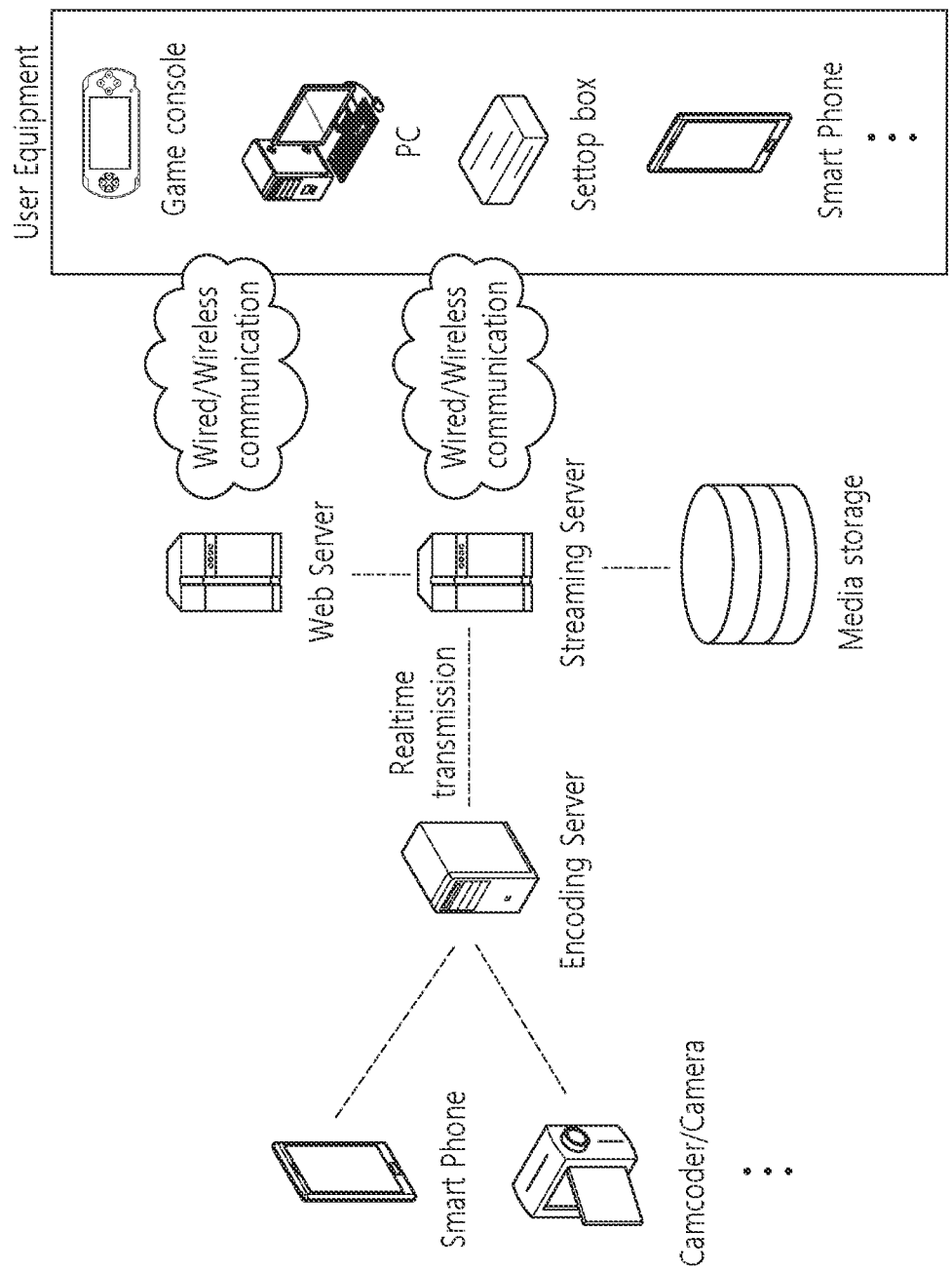
FIG. 19 illustrates a structural diagram of a contents streaming system to which the present disclosure is applied.

FIG. 19 illustrates a structural diagram of a contents streaming system to which the present disclosure is applied.

The content streaming system to which the embodiment(s) of the present disclosure is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

What is claimed is:

1. An image decoding method performed by a decoding apparatus, the method comprising:
    deriving a reference block in a reference picture based on a left neighboring block of a current block;
    deriving a subblock-based temporal merging candidate for the current block based on the reference block;
    deriving an inherited affine candidate for the current block;
    deriving a constructed affine candidate for the current block;
    constructing a subblock merge candidate list for the current block including the subblock-based temporal merging candidate, the inherited affine candidate and the constructed affine candidate;
    deriving motion information of sub-blocks of the current block based on the subblock merge candidate list;
    deriving prediction samples for the current block based on motion information of the sub-blocks; and
    generating a reconstructed picture based on the prediction samples,
    wherein based on a size of the current block being W×H, and an x component of a top-left sample position of the current block being a and a v component of the top-left sample position being b, the left neighboring block is a block including a sample at (a−1, b+H−1) coordinates.

2. The image decoding method of claim 1, wherein a position of the reference block is derived based on a motion vector of the left neighboring block.

3. The image decoding method of claim 2, wherein the motion vector for deriving the position of the reference block is fixed to the motion vector of the left neighboring block.

4. The image decoding method of claim 1; wherein the deriving the motion information of the sub-blocks of the current block comprises:
    selecting the subblock-based temporal merging candidate from the subblock merge candidate list; and
    deriving the motion information of the sub-blocks of the current block based on the subblock-based temporal merging candidate.

5. The image decoding method of claim 4, wherein motion information of a target sub-block among the sub-blocks is derived based on motion information of a collocated sub-block for the target sub-block included in the subblock-based temporal merging candidate.

6. An image encoding method performed by an encoding apparatus, the method comprising:
    deriving a reference block in a reference picture based on a left neighboring block of a current block;

deriving a subblock-based temporal merging candidate for the current block based on motion information of the reference block;

deriving an inherited affine candidate for the current block;

deriving a constructed affine candidate for the current block;

constructing a subblock merge candidate list for the current block including the subblock-based temporal merging candidate, the inherited affine candidate and the constructed affine candidate;

deriving motion information of sub-blocks of the current block based on the subblock merge candidate list;

deriving prediction samples for the current block based on the motion information of the sub-blocks; and encoding image information including prediction information for the current block, wherein based on a size of the current block being W×H, and an x component of a top-left sample position of the current block being a and a y component of the top-left sample position being b, the left neighboring block is a block including a sample at (a−1, b+H−1) coordinates.

7. The image encoding method of claim 6, wherein a position of the reference block is derived based on a motion vector of the left neighboring block.

8. The image encoding method of claim 7, wherein the motion vector for deriving the position of the reference block is fixed to the motion vector of the left neighboring block.

9. The image encoding method of claim 6, wherein the deriving the motion information of the sub-blocks of the current block comprises:

selecting the subblock-based temporal merging candidate from the subblock merge candidate list; and deriving the motion information of the sub-blocks of the current block based on the subblock-based temporal merging candidate.

10. The image encoding method of claim 9, wherein motion information of a target sub-block among the sub-blocks is derived based on motion information of a collocated sub-block for the target sub-block included in the subblock-based temporal merging candidate.

11. A non-transitory computer-readable storage medium storing bitstream generated by a method, the method comprising:

deriving a reference block in a reference picture based on a left neighboring block of a current block;

deriving a subblock-based temporal merging candidate for the current block based on motion information of the reference block;

deriving an inherited affine candidate for the current block;

deriving a constructed affine candidate for the current block;

constructing a subblock merge candidate list for the current block including the subblock-based temporal merging candidate, the inherited affine candidate and the constructed affine candidate;

deriving motion information of sub-blocks of the current block based on the subblock merge candidate list;

deriving prediction samples for the current block based on the motion information of the sub-blocks;

encoding image information including prediction information for the current block; and generating the bitstream including the image information, wherein based on a size of the current block being W×H, and an x component of a top-left sample position of the current block being a and a y component of the top-left sample position being b, the left neighboring block is a block including a sample at (a−1, b+H−1) coordinates.

* * * * *